(12) United States Patent
Nourbakhsh et al.

(10) Patent No.: US 10,041,177 B2
(45) Date of Patent: Aug. 7, 2018

(54) WATER TREATMENT SYSTEM AND METHOD

(71) Applicant: Formarum Inc., Richmond Hill (CA)

(72) Inventors: Seyed Nourbakhsh, Thornhill (CA); Amirsalar Yaraghi, Thornhill (CA); Timothy Muttoo, Mississauga (CA); Mohammad Meshkahaldini, North York (CA)

(73) Assignee: Formarum Inc., Richmond Hill (CA)

( * ) Notice: Subject to any disclaimer, the term of this patent is extended or adjusted under 35 U.S.C. 154(b) by 0 days.

(21) Appl. No.: 15/503,197

(22) PCT Filed: Aug. 7, 2015

(86) PCT No.: PCT/CA2015/000457
§ 371 (c)(1),
(2) Date: Feb. 10, 2017

(87) PCT Pub. No.: WO2016/023099
PCT Pub. Date: Feb. 18, 2016

(65) Prior Publication Data
US 2017/0226646 A1 Aug. 10, 2017

Related U.S. Application Data

(60) Provisional application No. 62/182,125, filed on Jun. 19, 2015, provisional application No. 62/035,758, filed on Aug. 11, 2014.

(51) Int. Cl.
*C02F 1/46* (2006.01)
*C25B 1/26* (2006.01)
(Continued)

(52) U.S. Cl.
CPC ............ *C25B 1/26* (2013.01); *C02F 1/4606* (2013.01); *C02F 1/4674* (2013.01);
(Continued)

(58) Field of Classification Search
CPC . C25B 1/26; C25B 15/02; C25B 15/08; C02F 1/4606; C02F 1/46104;
(Continued)

(56) References Cited

U.S. PATENT DOCUMENTS

| | | | |
|---|---|---|---|
| 5,228,964 | A | 7/1993 | Middleby |
| 6,508,929 | B1 | 1/2003 | Mercer |

(Continued)

FOREIGN PATENT DOCUMENTS

| | | |
|---|---|---|
| CA | 2471391 | 7/2003 |
| WO | 01/17908 | 3/2001 |

OTHER PUBLICATIONS

Extended European Search Report for Application No. 15832532.4-1371, dated Nov. 27, 2017, 9 pgs.

*Primary Examiner* — Arun S Phasge
(74) *Attorney, Agent, or Firm* — Lowenstein Sandler LLP

(57) ABSTRACT

A water treatment system comprising a housing adapted to receive a flow of water. An electrolytic treatment system disposed within the housing, for producing one or more product substances to treat the water. A hydro generation system disposed within the housing, for generating power from the flow of water. An electronic control system disposed within the housing, for receiving and managing the electrical power produced by the hydro generation system, and for controlling the transfer of electrical power to the electrolytic treatment system to control the production of the one or more product substances.

18 Claims, 23 Drawing Sheets

(51) Int. Cl.
  *C25B 15/08*    (2006.01)
  *C25B 15/02*    (2006.01)
  *C02F 1/467*    (2006.01)
  *C02F 1/461*    (2006.01)
  *F03B 3/04*     (2006.01)
  *C02F 103/42*   (2006.01)

(52) U.S. Cl.
  CPC .......... *C02F 1/46104* (2013.01); *C25B 15/02* (2013.01); *C25B 15/08* (2013.01); *F03B 3/04* (2013.01); *C02F 2103/42* (2013.01); *C02F 2201/46125* (2013.01); *C02F 2201/46165* (2013.01); *F05B 2220/20* (2013.01)

(58) Field of Classification Search
  CPC ........ C02F 2201/42; C02F 2201/46165; F03B 3/04; F05B 2220/20
  See application file for complete search history.

(56) References Cited

U.S. PATENT DOCUMENTS

| | | |
|---|---|---|
| 6,927,501 B2 | 8/2005 | Baarman et al. |
| 7,956,481 B2 * | 6/2011 | Baarman .................. F03B 1/00 290/54 |
| 8,366,885 B2 | 2/2013 | Liu et al. |
| 2011/0064626 A1 | 3/2011 | Kennedy |
| 2011/0139609 A1 | 6/2011 | Liu et al. |

* cited by examiner

WATER TREATMENT SYSTEM AND METHOD

CROSS-REFERENCE TO RELATED APPLICATIONS

This application is a national phase application of International Application No. PCT/CA2015/000457, filed on Aug. 7, 2015, which claims priority to U.S. Provisional Application No. 62/182,125, filed on Jun. 19, 2015, and 62/035,758, filed on Aug. 11, 2014, the entirety of which are incorporated herein by reference.

TECHNICAL FIELD

The present disclosure relates to water treatment. In particular, the present application relates to a water treatment device for treating water passing through a flow path.

BACKGROUND

Traditionally water resources and reservoirs, such as water delivered to users through distribution systems, or reservoir such as swimming pools, spas, hot tubs, water gardens, and the like, have been treated with manual addition of chemicals such as chlorine and bromine for sanitization and disinfection purposes. Moreover, a number of other manufactured chemicals are typically added to counteract the effects of disinfecting chemicals, such as chlorine and bromine, on various water parameters including pH and alkalinity.

Additionally, a number of chemicals are typically added to water to stabilize or supplement chlorine and bromine and improve water quality, including algaecides, stabilizers, and clarifiers. The purchase, transportation, handling, water testing, and manual addition of these chemicals, especially for residential recreational facilities such as swimming pools, presented significant problems to owners and operators of these facilities. These problems include: the bather safety concerns arising from the addition of high dosages of these artificially manufactured chemicals, the high operating costs of chemicals required to effectively maintain water quality, and excessive time and effort required to balance and control various water parameters.

A number of electrical devices and systems have been used to reduce the impacts of these problems. These systems and devices include salt chlorination systems, ultra-violet disinfection systems, ozone generation systems, metallic ionization systems, or a combination of these systems and devices working together. The difficult installation of these systems, requiring electrical and plumbing expertise is a limiting factor for their usage. Moreover, operation of some of these systems, for example salt chlorination or metallic ionization systems, are usually carried out manually with some difficulty, requiring the user to test and manually adjust production rates to effectively sanitize water. Therefore, a device capable of reducing the installation and operation effort in such systems is desired.

Conventionally, electrical devices and systems described above utilize an electrical control panel installed and connected to 115 VAC or 240 VAC power supply, such as a power plug. The control panel regulates the electrical power, and in some cases converts the AC current to DC current, and supplies a separate electrical treatment device with electrical power using electrical wires. The electrical treatment device is usually installed in-line or at the end of a water flow path. Other systems have attempted to create self-powered devices, reducing the installation difficulty.

For example, U.S. Pat. No. 6,508,929, issued Jan. 21, 2003, to R. M. Mercer discloses one possible solution for outdoor environments exposed to sufficient sunlight. A floating salt housing unit produces chlorine utilizing solar power. The system is described as requiring an outdoor environment and direct exposure to sufficient sunlight that is not always available. Regardless, because of the high energy requirements of electrolytic processes, such as salt chlorination, solar power solutions might not be sufficient or practical for complete and reliable sanitation of a large reservoir such as a swimming pool.

For some applications and treatment systems, a hydro-generation system has been used. For example, U.S. Pat. No. 6,927,501, issued Aug. 9, 2005 to Baarman et al., discloses a self-powered liquid treatment system including a housing that may be mounted at the end of a faucet. The housing including a filter, an ultra-violet light source, and a hydro-generator. The system disclosed is designed for installation at the end of a faucet, such that the water free flows out of the end of the device. The system's mechanical design, especially the mechanical design of the hydro-generator system, is not practical or ideal for in-line installations, where it is desirable for the system to have a small cylindrical profile and fit in-line in the existing flow path without external extruded features and housings for the electrical generator or rotatable member. Additionally, in in-line system applications with high flow rates, it is not ideal, due to the excessive pressure drop caused by the change in the direction of the flow as is required by the mechanical design of the system disclosed. Moreover, the control method provided is designed for an ultra-violet system and is not beneficial when chemical substances such as chlorine or metallic ions are produced for sanitization.

BRIEF DESCRIPTION OF THE DRAWINGS

In drawings which illustrate by way of example only embodiments of the present disclosure, in which like reference numerals describe similar items throughout the various figures.

DETAILED DESCRIPTION OF THE INVENTION

A self-powered and self-contained water treatment device is described in this invention. In some embodiments, the device is designed with a single cylindrical housing, wherein all hydro-generation, treatment and control systems are enclosed within the single cylindrical housing. According to some embodiments, the hydro-generation system is designed to produce sufficient electrical power to operate an electrolytic treatment system such as a salt chlorination and/or metallic ionization system. In at least one aspect, the hydro-generation system is designed to produce sufficient electrical power to operate an electrolytic treatment system including an ion generator, and a controller.

According to some embodiments, an electrolytic treatment system, such as a chlorine generation and/or metallic ionization system is used and is controlled by an electronic control system, powered by a hydro generation system.

According to some embodiments, an electronic control system within the device may be able to receive and transmit user/third-party inputs and outputs through a user display and/or a communication system, such as a wireless communication system. The inputs may be used to improve the performance of the device, while the outputs can be generated to provide useful information to the user such as flow rate of fluid and sanitization rates.

According to some embodiments, an electronic control system may be able to determine the flow rate of fluid and regulate the production of sanitizing substances accordingly to achieve a consistent and controlled chemical concentration in the outlet stream of the device in a one pass system.

Figure 1:
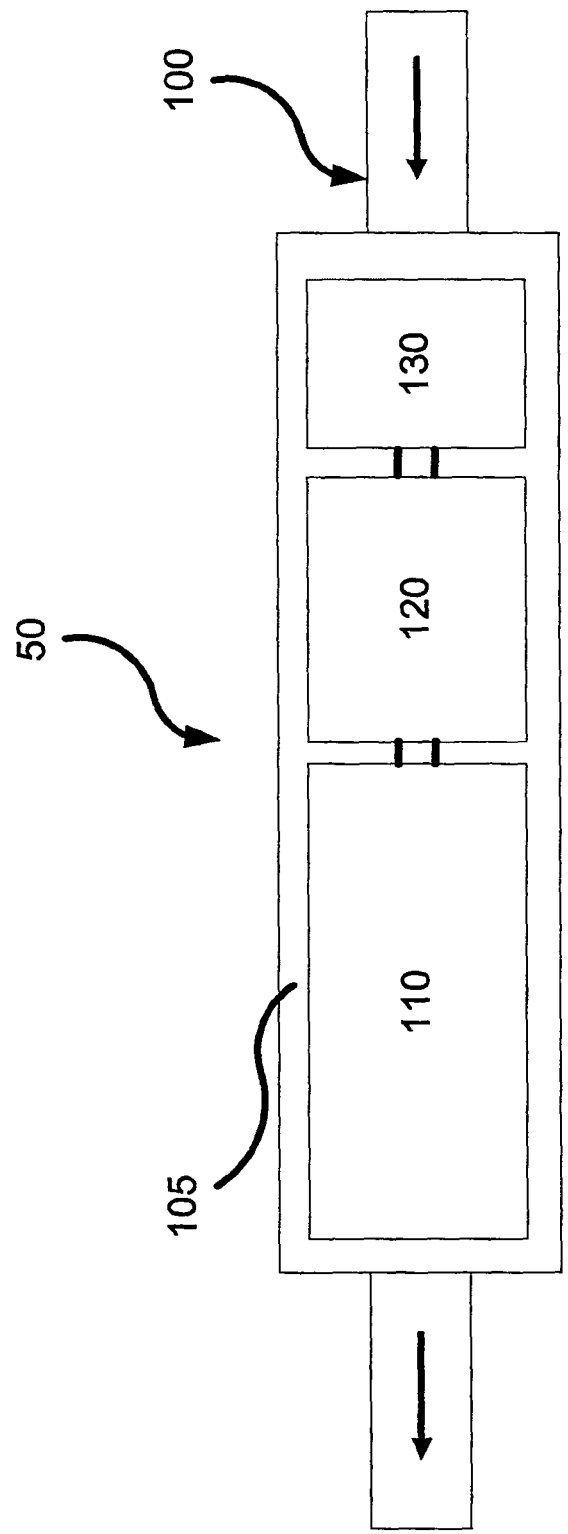
FIG. 1 is a block diagram of an embodiment of a water treatment system.

FIG. 1 is a block diagram of an embodiment of a water treatment device 50. Treatment housing 105 in this example is installed in-line with a fluid flow path 100, forming a new section of the flow path 100 through which the fluid travels. A flow path 100 can be part of a one-pass liquid distribution system, or it can be part of a liquid recirculation system for a liquid reservoir, such as may be used for swimming pools, ponds, and hot tubs. Treatment housing 105 in this example comprises an electrolytic treatment system 110, a hydro generation system 130, and an electronic control system 120, all systems being mechanically disposed within the treatment housing 105. While the electrolytic treatment system 110, a hydro generation system 130, and an electronic control system 120 are shown in a specific order within the treatment housing 105 by way of example, it is understood that their order and arrangement within the treatment housing 105 may varied. For instance, the hydro generation system 130 could be located between the other two components, or at the discharge end of the treatment housing 105.

As the fluid travels through a treatment housing 105, it embarks a force on a rotatable member of hydro generation system 130. As a result, electrical power is produced by the hydro generation system 130. The produced electrical power is transferred to an electronic control system 120. Electronic control system 120 functions by consuming a part of the electrical power to perform internal functions, such as power management, processing, control, storage, communications, etc. Electronic control system 120, in this example transfers the remaining electrical power or alternatively a controlled quantity of electrical charge to an electrolytic treatment system 110. Electrolytic treatment system 110, comprising of one or more electrolytic cells, and subsequently produces one or more useful substances for water treatment purposes including but not limited to: chlorine gas as part of the salt chlorination process, or metallic ions such as copper and/or silver ions. As such, a water treatment device according to FIG. 1 is a self-contained device, enclosing all systems required to achieve water treatment internally within a treatment housing 105. Furthermore, the water treatment device 50 is powered by the flow of the fluid along the flow path 100, simplifying installation and operation.

Figure 2:
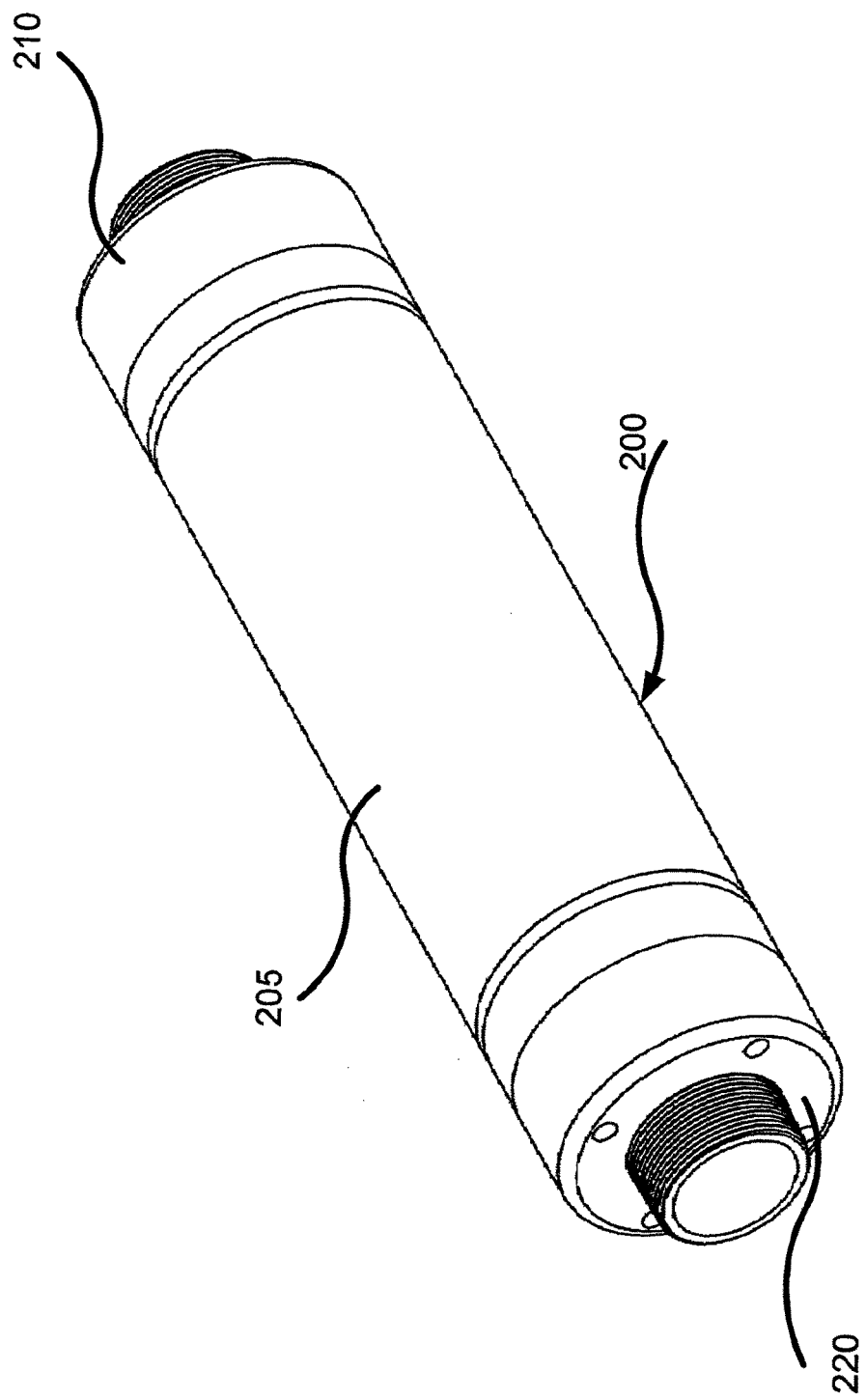
FIG. 2 is an isometric view of an embodiment of a water treatment system.

FIG. 2 is an isometric view of an embodiment of a water treatment device 200. According to FIG. 2, the water treatment device 200 is a completely self-contained device, with all systems contained within an outer shell 205 with a fluid inlet end cap 210 and a fluid outlet end cap 220. Fluid inlet end cap 210 and fluid outlet end cap 220 are designed to be conveniently attached or installed in-line in a flow path, such as a PVC pipeline, forming part of a recirculation system. In the example of FIG. 2, the fluid inlet end cap 210 and the fluid outlet end cap 220 are conveniently shown with threaded couplers for coupling to adjacent pipe segments in the flow path. Other coupling means known to the person of skill in the art may be used in place of the threaded couplings shown in FIG. 2.

Figure 3:
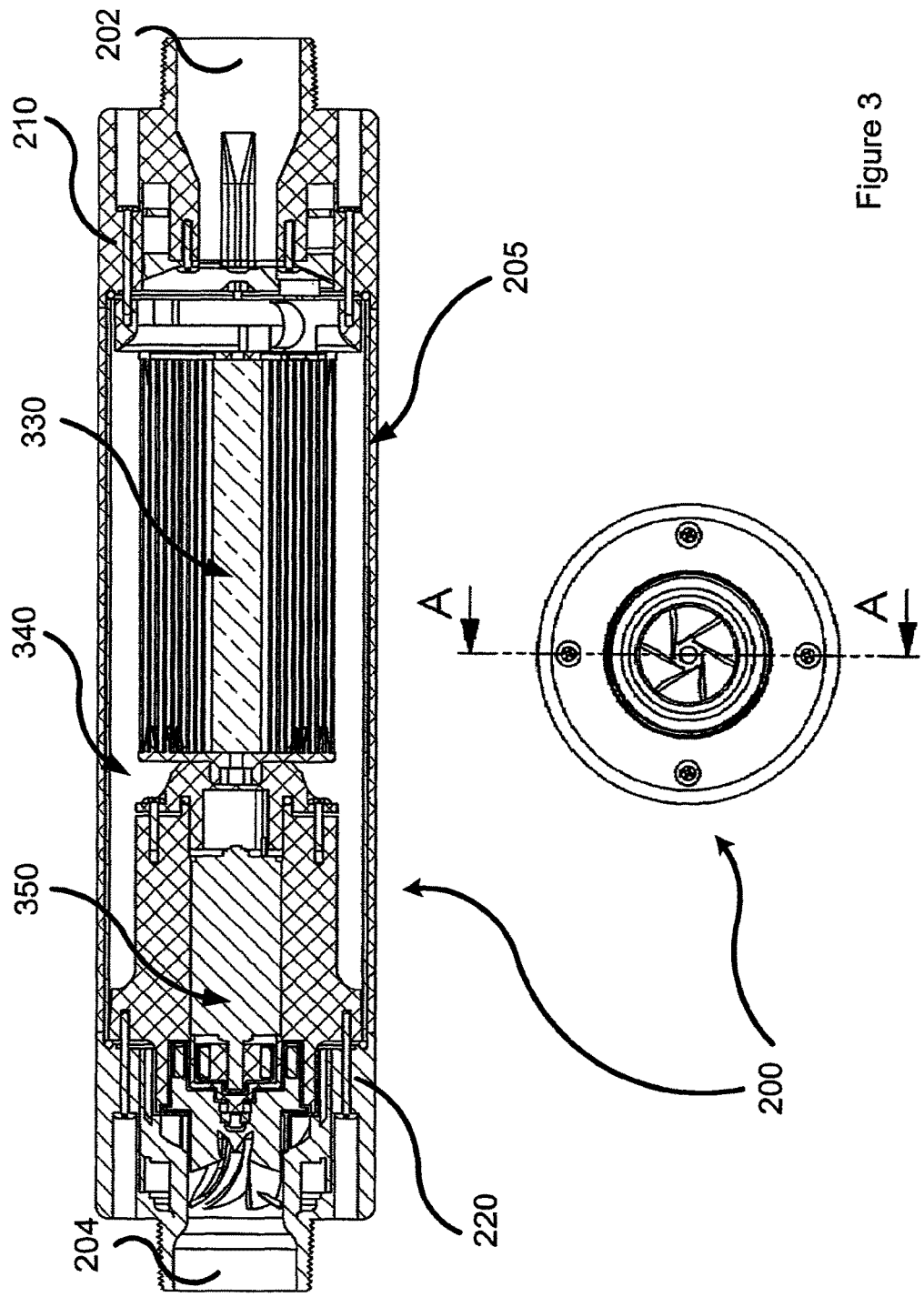
FIG. 3 is a section view schematic of an embodiment of a water treatment system.

FIG. 3 illustrates an end view and a section view schematic of an embodiment of a water treatment device 200. Inlet end cap 210, in this example is a plastic part that performs a number of functions including: providing a flow path for fluid to enter the water treatment device 200, forming a part of the treatment housing 205 containing and concealing all other internal parts, and providing a waterproof enclosure for housing the electronic control system (According to FIG. 15). Inlet end cap 210, in this example is an accessible part easily removed using mechanical fasteners to gain access to the internal components of the device 200. Inlet end cap 210 can also be easily replaced using mechanical fasteners, along with the enclosed electronic control system, in order to conveniently replace a malfunctioning electronic control system or upgrade the device 200, for instance, with a new electronic control system. Inlet end cap 210 can further be easily removed using mechanical fasteners to allow easy access to remove or replace an electrolytic treatment system 330 for routine maintenance or replacement with a new electrolytic treatment system 330.

An outer shell 205 in this example performs a number of functions including but not limited to forming a part of treatment housing containing and concealing all other internal parts. An outer shell 205 may be constructed from a single layer of plastic or other suitable material for containment or from one or more layers to perform other functions. For example, an inner conductive layer such as stainless steel, electrically connected to an electronic control system, may participate in the electrolytic treatment process by providing a cathodic surface opposing an outer electrode of an electrolytic treatment system 330, thus improving the performance of an electrolytic treatment system by providing additional electrode when required. A second outer layer in this example may be a non-conductive layer of plastic or other material preventing electrical leak to the environment or electrical hazards to users. In an aspect, the second outer layer may be a transparent layer allowing the user to visually see the inner metallic conductive layer.

An electrolytic treatment system 330 has a number of parts that combine to enable the electrolytic treatment system 330 to efficiently produce useful substances for treatment purposes when provided with electrical power. Electrolytic treatment system 330 includes at least one electrolytic cell, comprised of at least two electrodes, able to produce at least a single useful substance for water treatment through a single electrochemical process, for example to produce copper and silver ions through the copper silver ionization process. Electrolytic treatment system 330 may include more than one electrolytic cell to produce one or more useful substances through one or more electrochemical processes, for example an independent electrolytic cell to produce copper and silver ions through the copper and silver ionization process and a second independent electrolytic cell to produce chlorine through the salt chlorination process. Electrolytic treatment system 330 may also include a single hybrid electrolytic cell, able to produce two or more useful substances, through two or more electrochemical processes, for example a hybrid electrolytic cell to produce copper and silver ions and chlorine through copper and silver ionization and salt chlorination process (e.g. as according to FIG. 5). The design of such a hybrid electrolytic cell is described in further details in later sections. Said electrolytic cells may be constructed from plate, mesh, disc-like, tubular, rod-shaped electrodes or combinations of these forms to achieve improved performance, reduced power consumption, or reduced space requirements.

An electrolytic treatment system 330 may further include additional parts, including but not limited to: structural members to position electrodes favorably within the device and prevent direct contact between electrodes, conductive leads to direct electrical current to and from an electronic control system, waterproof electrical connectors that may be connected and disconnected to allow the removal of electrolytic treatment system 330 from the device for routine maintenance or replacement, and mechanical features to facilitate removal and handling of an electrolytic treatment system 330 by the user.

A fluid path 340 within the treatment housing provides a path for the fluid to travel from the inlet 202 to the outlet 204 with minimal pressure drop. A fluid path 340 may further guide the flow as it approaches a hydro generation system 350 proximate to the outlet 204 of the device to improve power generation.

A hydro generation system 350 has a number of parts that in aggregate enable the hydro generation system to maximize electrical power generation for use by the electronic control system and the electrolytic treatment system 330, while reducing pressure drop across hydro generation system 350. A hydro generation system 350 at least includes a rotatable member responsive to the flow of fluid with the flow path 340 and an electrical generator with a shaft connected to the rotatable member, so as to convert the mechanical energy of the shaft to electrical energy. A hydro generation system 350 may also include a generator housing to encapsulate an electrical generator and prevent direct contact with fluid, a mechanical drive system to directly or indirectly connect the rotatable member to an electrical generator shaft through a direct mechanical connection, a magnetically coupled drive, and/or a gearbox to modify the speed and torque of the shaft. A hydro generation system 350 may further include bearings to facilitate the rotation of the rotatable member or electrical generator shaft, sealing parts and components to avoid leakage of fluid to the generator housing, and structural members to position the generator housing and rotatable member in favourable locations within the treatment housing. A hydro generation housing 350 may further include mechanical guide features that favorably direct and accelerate the fluid to the rotatable member at advantageous angles so as to maximize electrical power generation of the system.

In this example of a hydro generation system 350, an electrical generator may be an internal component, inline with the fluid flow, encapsulated within generator housing, to avoid the technical complexity and cost disadvantages of housing and driving an electrical generator shaft external to the fluid flow. Conveniently, this arrangement increases the heat transfer rate from the electrical generator as the fluid conveys excess heat from the generator. Liquid, usually at a lower temperature, travels around the electrical generator, assisting with heat removal. The rate of heat removal being directly dependent on the material of construction, shape and wall thickness of the generator housing, the area of the interface, and the volumetric flow rate of the fluid past the generator. Accordingly, generator housing can be designed and constructed so as to prevent heat build-up in the electrical generator, ensuring consistent and efficient performance.

An outlet end cap 220 is provided, which in this example is a plastic part that performs a plurality of functions including: providing a flow path for fluid to exit the water treatment device 200, forming a part of the treatment housing 205 containing and concealing all other internal parts, and directing and accelerating the fluid to the rotatable member at advantageous angles, using embedded mechanical guide features, so as to maximize electrical power generation of the system. As will be appreciated, the outlet end cap 220 may be constructed of other suitable materials known to a person of skill in the art.

The mechanical guide features may include, for instance, nozzles, guide vanes, or other advantageous mechanical shapes. Outlet end cap 220, in this example is an accessible part easily removed using mechanical fasteners to gain access to the internal components of the device. Outlet end cap 220 can also be easily replaced using mechanical fasteners in order to conveniently repair or replace a malfunctioning hydro generation system 350 or upgrade the device with a new and more advance hydro generation system 350. Outlet end cap 220 can further be easily replaced, along with its embedded mechanical guide features, using mechanical fasteners to provide optimized mechanical guide performance for various liquid flow rates and pressures, to ensure maximum power generation in various conditions.

Figure 4:
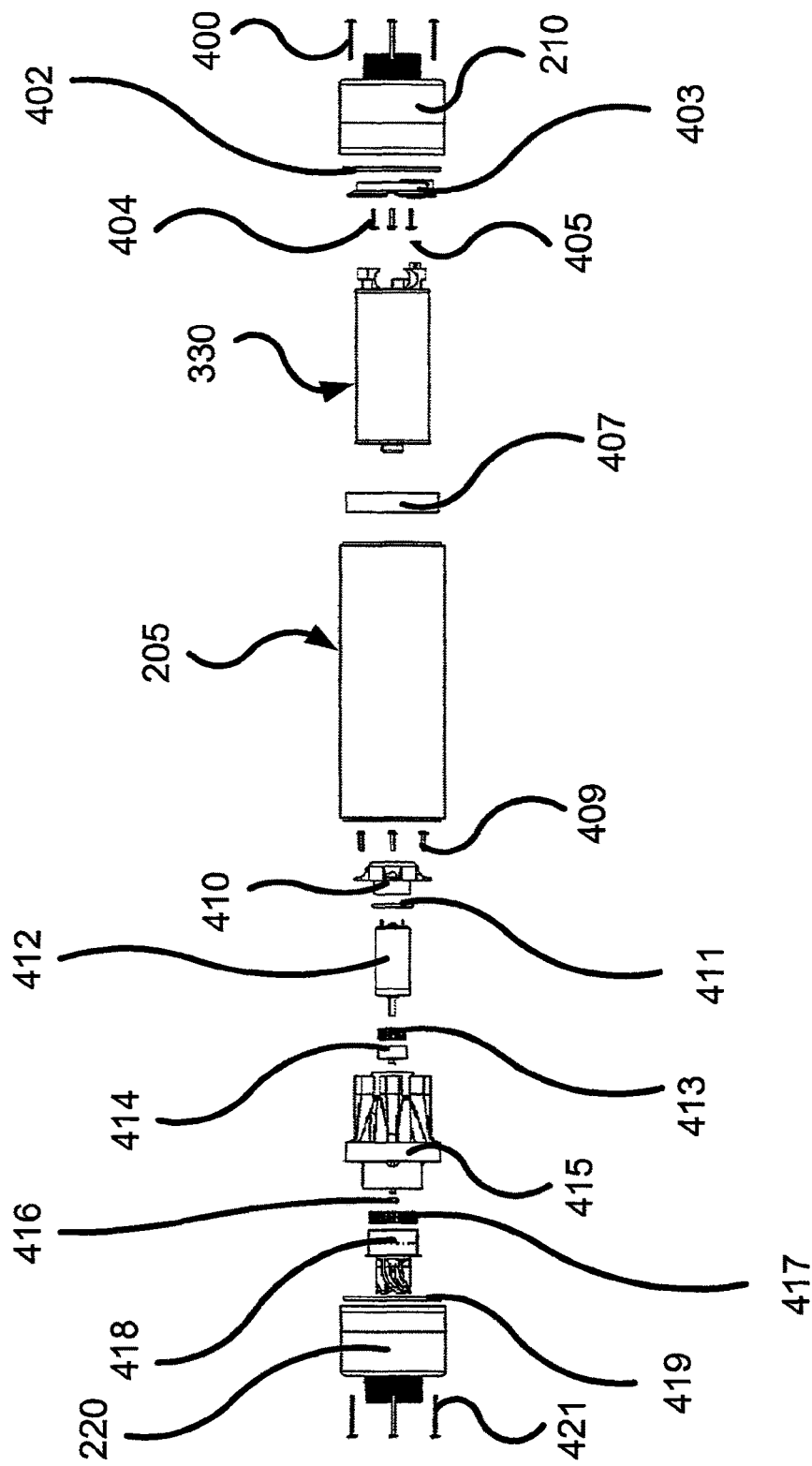
FIG. 4 is a side view exploded schematic of the embodiment of FIG. 3.

FIG. 4 is a side view exploded schematic of the embodiment of FIG. 3. In the exemplar embodiment, a holder ring 407 is mechanically affixed internally to an outer shell 205 in order to provide structural support for an electrolytic treatment system 330 and provide a structural surface for mechanically fastening an inlet end cap 210 assembly to an outer shell 205. An electrolytic treatment system 330 is inserted into the outer shell 205 and fixed in position by the holder ring 407. A compressive O-ring or gasket 405 provides a waterproof chamber for electrical connections to be made between the electrolytic treatment system 330 and the inlet end cap 210 assembly automatically upon mechanical fastening of the assembly. One or more mechanical fasteners 404 are used to mechanically fasten an electronic control system cap 403 to the inlet end cap 210, encapsulating an electronic control system inside the inlet end cap 210. A potting material may be used to fill an enclosure within the inlet end cap 210 after an electronic control system has been embedded therein, further ensuring a waterproof housing for an electronic control system. The electronic control system cap 403 may further provide conductive electrical pins to enable electrical connections to be made between an electronic control system, embedded within the inlet end cap 210 and the electrolytic treatment system 330. One or more mechanical fasteners 400 are used to mechanically fasten the inlet end cap 210, enclosing the electronic control system, to the holder ring 407. A compressive O-ring or gasket 402 is compressed between the inlet end cap 210 and the outer shell 205, ensuring a waterproof connection, preventing a leak from inside the device to the outside environment.

In the example thus illustrated, the inlet end cap 210 and the outlet end cap 220 provide sealing engagement with the treatment housing 205 to capture the electrolytic treatment system 330 and the hydro generation system 350 within the treatment housing 205.

Two or more magnets 413 are inserted into a magnetic coupling 414, which is a structural component holding the magnets 413, to create an inner ring of magnets with a determined size and polarity arrangement desirable in a magnetically coupled drive. The magnetically coupled drive being the exemplar embodiment illustrated in this example.

The assembly of magnets 413 and the magnetic coupling 414 is mechanically fastened to the shaft of an electrical generator 412. The new assembly is subsequently inserted into a generator housing 415 providing a waterproof environment for an electrical generator 412 and positioning a hydro generation system internally within the fluid flow path. A generator housing cap 410 is mechanically fastened to generator housing 415, encapsulating an electrical generator 412 and components of a magnetically coupled drive inside a generator housing 415. A compressive O-ring or gasket 411 is compressed between a generator housing 415 and a generator housing cap 410 to provide sealing and prevent liquid leakage to interiors of a generator housing 415. A bearing 416 is mechanically fastened to a generator housing 415 in a manner to facilitate the rotations of a rotatable member 418. Two or more magnets 417 are inserted into cavities in a rotatable member 418, creating an outer ring of magnets with a determined size and polarity arrangement desirable in a magnetically coupled drive, since a magnetically coupled drive is illustrated in this example.

A rotatable member 418, holding magnets 417, is mechanically fastened to bearing 416, creating a new assembly containing a plurality of parts of a hydro generation system. The new assembly is inserted and mechanically fastened to the inner wall of an out shell 205. An outlet end cap 220, including embedded guide features is mechanically fastened to an outer shell 205, using one or more mechanical fasteners 421. A compressive O-ring or gasket 419 is compressed between an outlet end cap 220 and an outer shell 205, ensuring a waterproof connection, preventing a leak from inside the device to the outside environment.

Figure 5:
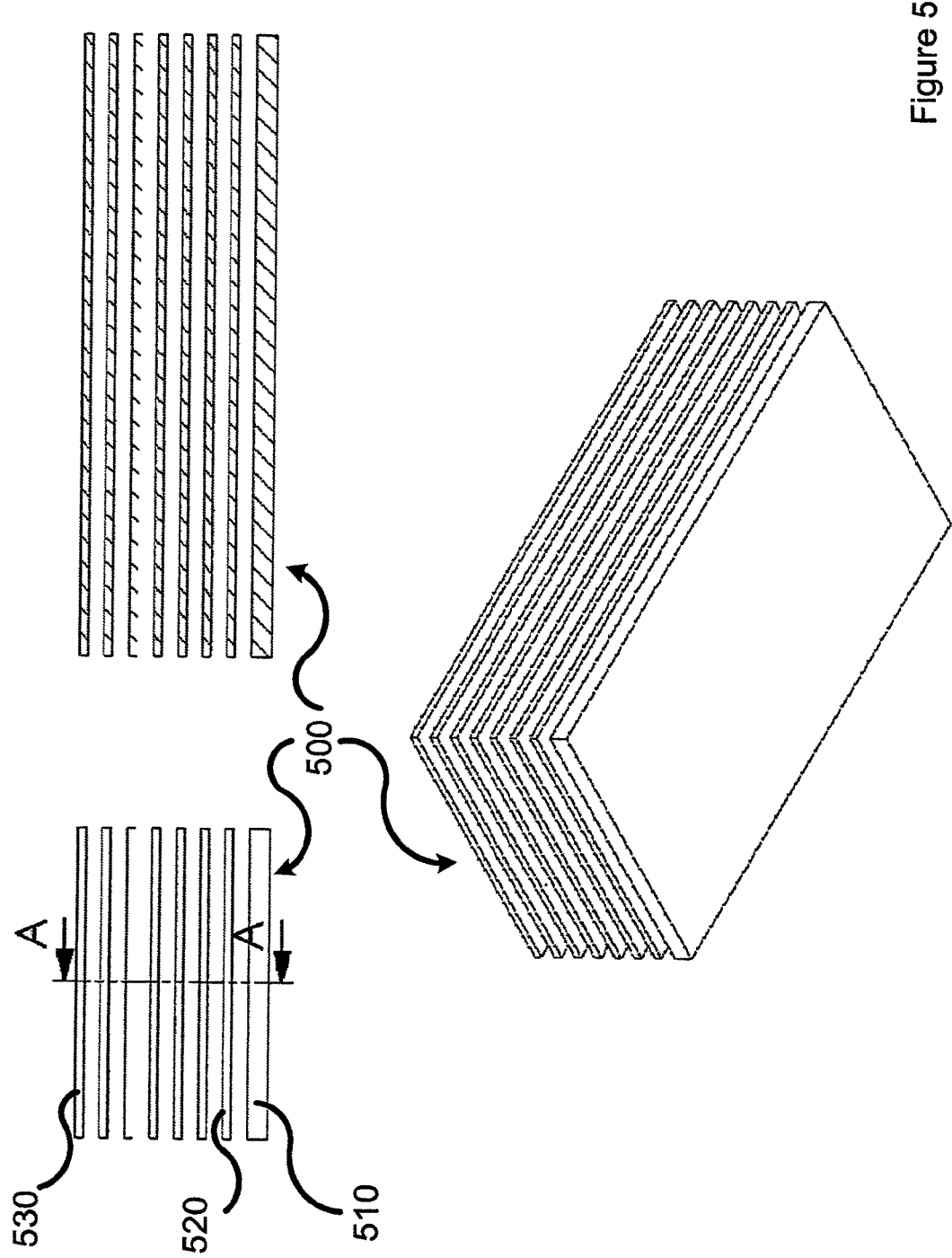
FIG. 5 is a series of views of an embodiment of an electrolytic cell.

FIG. 5 is a series of views of an exemplar embodiment of an electrolytic cell. In the embodiment of FIG. 5, electrolytic cell 500 is a hybrid electrolytic cell, capable of producing two or more useful substances, through two or more electrochemical processes, for example a hybrid electrolytic cell to produce copper and/or silver ions and chlorine through copper and silver ionization and salt chlorination process respectively. Furthermore, an electrolytic cell 500 may be able to operate each electrochemical process independently or operate both processes simultaneously, through a controlled transfer of electrical charge to desired electrodes by a power supply for each mode of operation. In an aspect, the electronic control system is operative to selectively independently activate each of the electrochemical processes available from the electrolytic cell 500.

Referring to FIG. 5, an electrolytic cell 500 is made up of two or more electrodes. In this example, a first ionization electrode 510 is made of a metallic element or alloy, suitable for producing metallic ions for water treatment purposes. A second adjacent chlorine-evolving electrode 520, in this example is made of a material suitable for chlorine production, for example titanium. Chlorine-evolving electrode 520 has an opposing surface to a first ionization electrode 510, separated by an electrolyte. A first ionization electrode 510 and a chlorine-evolving electrode 520 are both connected to a power supply, which is capable of independently powering and switching the polarity of each electrode. As such, the electrolytic cell in this example may be operated independently in ionization mode, by the power supply applying a higher DC voltage to a first ionization electrode 510 and a lower DC voltage to a chlorine-evolving electrode 520. Thus a first ionization electrode 510 will operate as an anode and a chlorine-evolving electrode 520 as a cathode, completing the electrochemical process to produce metallic ions. The electrolytic cell in this example may be operated independently in chlorine generation mode, by the power supply applying a lower DC voltage to a first ionization electrode 510 and a higher DC voltage to a chlorine-evolving electrode 520. Thus a first ionization electrode 510 will operate as a cathode and a chlorine-evolving electrode 520 as an anode, completing the electrochemical process to produce chlorine.

Figure 6:
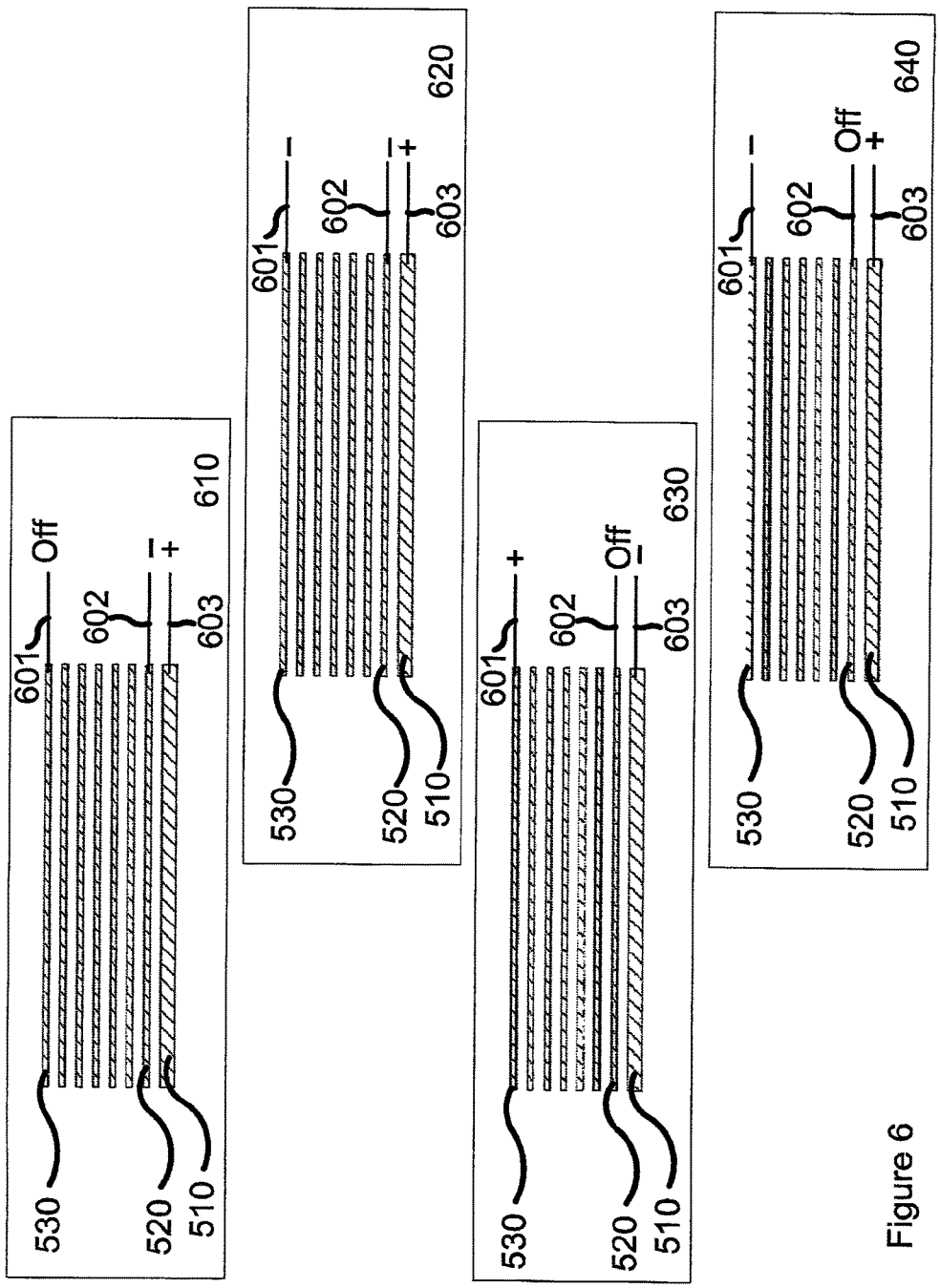
FIG. 6 is a series of section views of the embodiment of FIG. 5.

The concept can be further expanded to operate both processes simultaneously by using three or more electrodes as illustrated in FIG. 5 and FIG. 6. FIG. 6 is a series of section views of the embodiment of FIG. 5. FIG. 6 illustrates four different modes of operation of a hybrid electrolytic cell 500 most advantageous to use in a water treatment system, although more modes of operation are possible. Electrodes 510, 520, and 530 are electrically connected to a power supply by leads 603, 602, and 601 respectively. Any number of intermediate electrodes may be used to achieve a bipolar cell configuration as favorable for various processes, for example the salt chlorination process. In this example, five intermediate bipolar electrodes, not electrically connected to a power supply, are used between chlorine-evolving electrodes 520 and 530.

A power supply in this example is able to switch off and switch the polarity of each connected electrode by switching off or switching the polarity of electrical current in leads 603,602, and 601. Modes of operation in blocks 610 and 620 are equivalent in operation and illustrate an ionization mode of operation in this example. In block 610, a power supply supplies an ionization electrode 510 with positive polarity, a chlorine-evolving electrode 520 with negative polarity and switches of the electrical connection to a chlorine-evolving electrode 530. As such the electrolytic cell is independently operated in ionization mode. In block 620, a power supply supplies an ionization electrode 510 with positive polarity and chlorine-evolving electrodes 520 and 530 with negative polarity. Since there is no voltage potential across electrodes 520 and 530, the electrolytic cell is still independently operated in ionization mode. The mode of operation illustrated in block 620 may be advantageous to reduce costs and space requirements of a power supply. In block 630, a power supply supplies an ionization electrode 510 with negative polarity, a chlorine-evolving electrode 530 with positive polarity and switches off the electrical connection to a chlorine-evolving electrode 520. In this mode of operation, the electrolytic cell is independently operated in a salt chlorination mode, with a chlorine-evolving electrode 520 acting as a bipolar electrode. In block 640, a power supply supplies an ionization electrode 510 with positive polarity, a chlorine-evolving electrode 530 with negative polarity and switches of the electrical connection to a chlorine-evolving electrode 520. In this mode of operation, the electrolytic cell is simultaneously operated in both ionization and salt chlorination mode, with a chlorine-evolving electrode 520 acting as a bipolar electrode.

There are major technical and cost advantages of using a single hybrid electrolytic cell to produce two or more useful substances, through two or more electrochemical processes, when such an operation is desirable. A hybrid electrolytic cell is an improvement on using two separate conventional electrolytic cells, because operating two independent electrolytic cells requires the use of at least four electrodes, which in case of a hybrid electrolytic cell is reduced to two for independent operation and three for simultaneous operation. A second performance advantage is obtained using the additional opposing surface area provided, for example by electrode 510 in block 630 of FIG. 6. By switching the polarity of electrode 510 to negative in this mode of operation, electrode 520 acts as a bipolar electrode increasing the production rate of the cell. The performance advantages above can be used to reduce the space, material, and electrical power requirements of the electrolytic cell.

Figure 7:
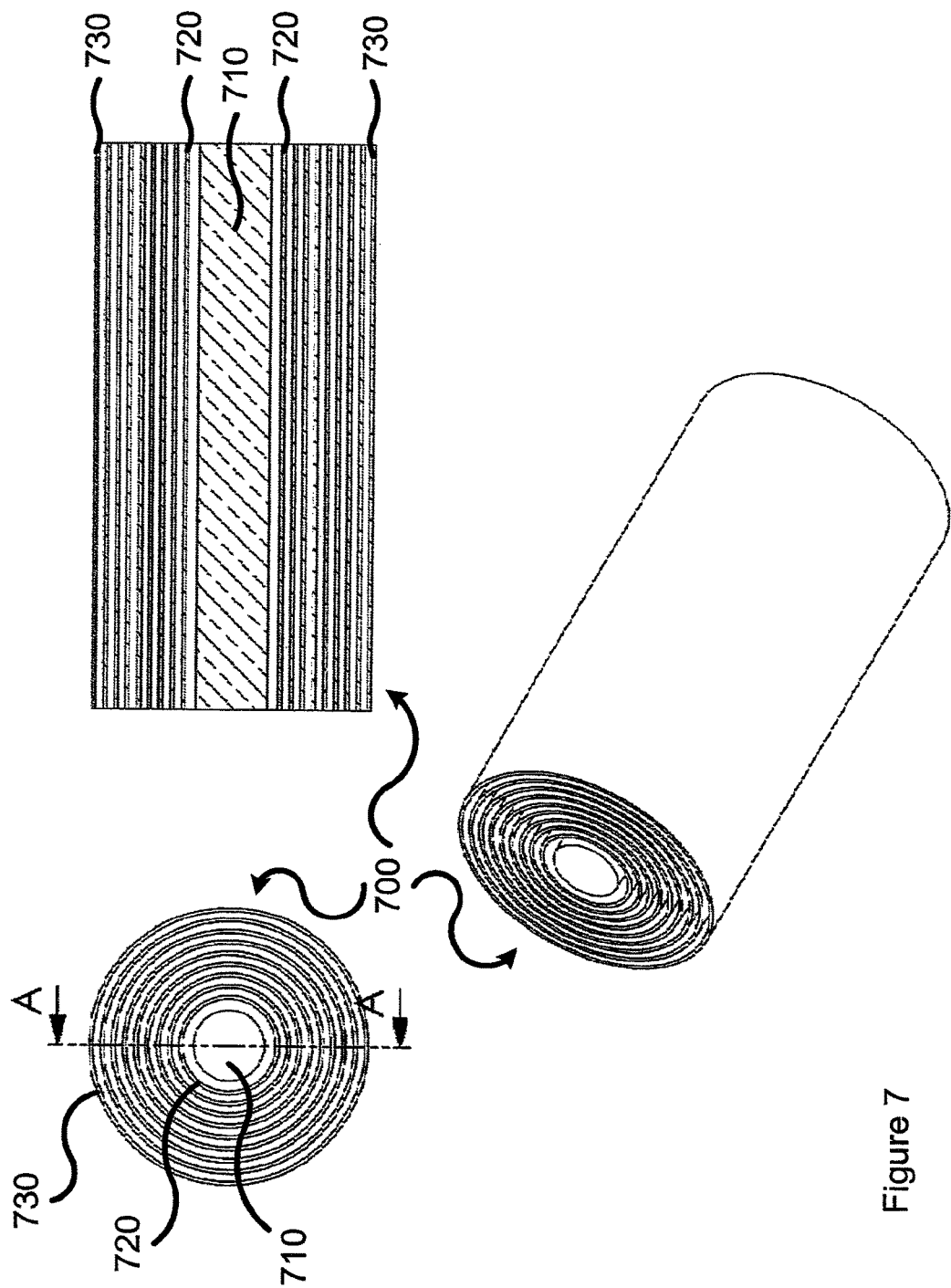
FIG. 7 is a series of views of an embodiment of an electrolytic cell.

FIG. 7 is a series of views of an embodiment of an electrolytic cell. Electrolytic cell 700 is a hybrid electrolytic cell, similar in operation to an electrolytic cell 500. In this arrangement same operations and advantages of a hybrid electrolytic cell is extended to an electrolytic cell 700 of a concentric design.

Referring to FIG. 7, an electrolytic cell 700 is made up of two or more electrodes. In this example, a first ionization electrode 710 is made of a metallic element or alloy, suitable for producing metallic ions for water treatment purposes. A second adjacent chlorine-evolving electrode 720, in this example is made of a material suitable for chlorine production, for example titanium. Chlorine-evolving electrode 720 has an opposing surface to a first ionization electrode 710, separated by an electrolyte. A first ionization electrode 710 and a chlorine-evolving electrode 720 are both connected to a power supply, which is capable of independently powering and switching the polarity of each electrode. As such, the electrolytic cell in this example may be operated independently in ionization mode, by the power supply applying a higher DC voltage to a first ionization electrode 710 and a lower DC voltage to a chlorine-evolving electrode 720. Thus a first ionization electrode 710 will operate as an anode and a chlorine-evolving electrode 720 as a cathode, completing the electrochemical process to produce metallic ions. The electrolytic cell in this example may be operated independently in chlorine generation mode, by the power supply applying a lower DC voltage to a first ionization electrode 710 and a higher DC voltage to a chlorine-evolving electrode 720. Thus a first ionization electrode 710 will operate as a cathode and a chlorine-evolving electrode 720 as an anode, completing the electrochemical process to produce chlorine.

Figure 8:
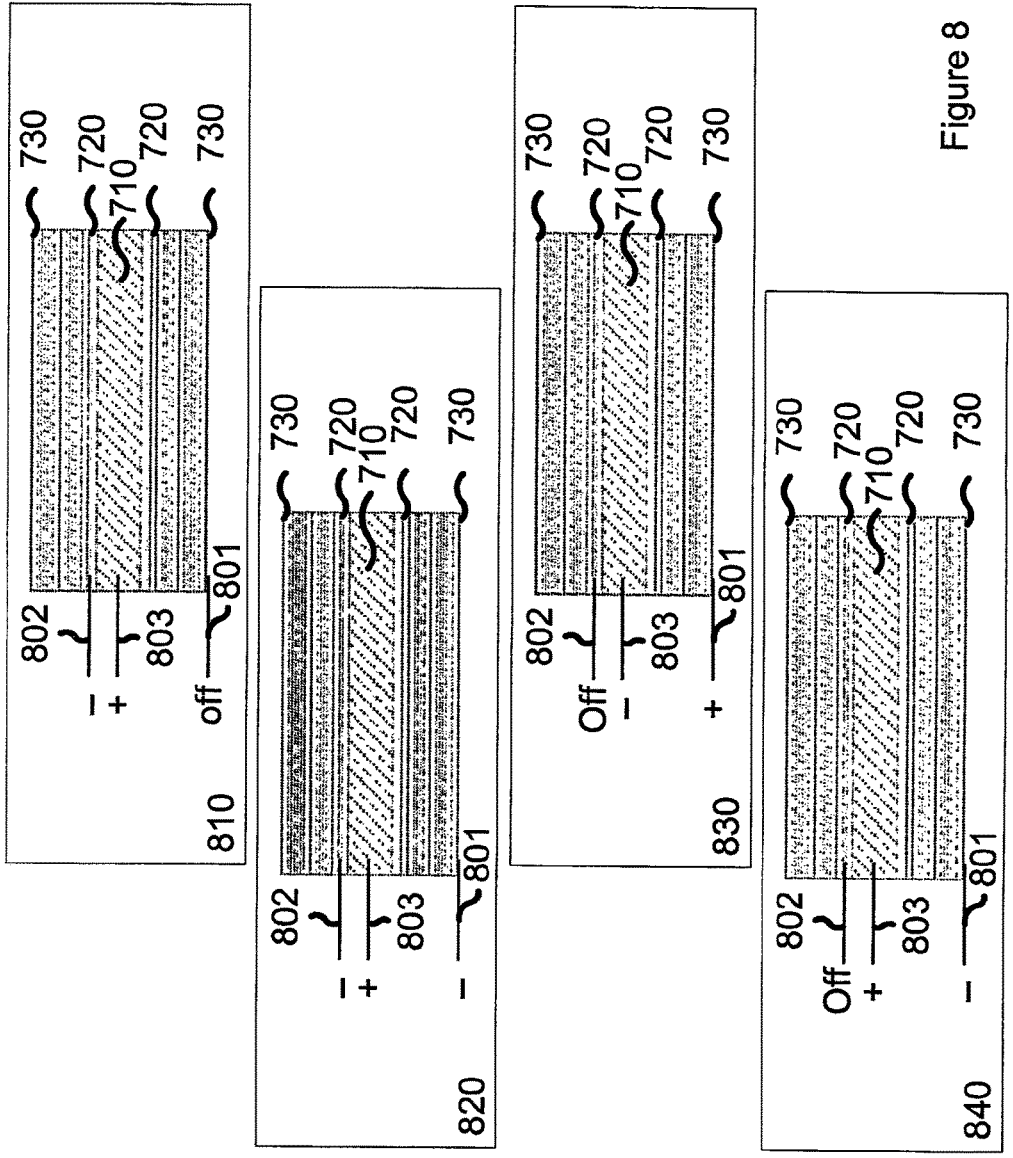
FIG. 8 is a series of section views of the embodiment of FIG. 7.

The concept can be further expanded to operate both processes simultaneously by using three or more electrodes as illustrated in FIG. 7 and FIG. 8. FIG. 8 is a series of section views of the embodiment of FIG. 7. FIG. 8 illustrates four different modes of operation of a hybrid electrolytic cell 700 most advantageous to use in a water treatment system, although more modes of operation are possible. Electrodes 710, 720, and 730 are electrically connected to a power supply by leads 803, 802, and 801 respectively. Any number of intermediate electrodes may be used to achieve a bipolar cell configuration as favorable for various processes, for example the salt chlorination process. In this example, five intermediate bipolar electrodes, not electrically connected to a power supply, are used between chlorine-evolving electrodes 720 and 730.

A power supply in this example is able to switch off and switch the polarity of each connected electrode by switching off or switching the polarity of electrical current in leads 803,802, and 801. Modes of operation in blocks 810 and 820 are equivalent in operation and illustrate an ionization mode of operation in this example. In block 810, a power supply supplies an ionization electrode 710 with positive polarity, a chlorine-evolving electrode 720 with negative polarity and switches of the electrical connection to a chlorine-evolving electrode 730. As such the electrolytic cell is independently operated in ionization mode. In block 820, a power supply supplies an ionization electrode 710 with positive polarity and chlorine-evolving electrodes 720 and 730 with negative polarity. Since there is no voltage potential across electrodes 720 and 730, the electrolytic cell is still independently operated in ionization mode. The mode of operation illustrated in block 820 may be advantageous to reduce costs and space requirements of a power supply. In block 830, a power supply supplies an ionization electrode 710 with negative polarity, a chlorine-evolving electrode 730 with positive polarity and switches of the electrical connection to a chlorine-evolving electrode 720. In this mode of operation, the electrolytic cell is independently operated in a salt chlorination mode, with a chlorine-evolving electrode 720 acting as a bipolar electrode. In block 840, a power supply supplies an ionization electrode 710 with positive polarity, a chlorine-evolving electrode 730 with negative polarity and switches of the electrical connection to a chlorine-evolving electrode 720. In this mode of operation, the electrolytic cell is simultaneously operated in both ionization and salt chlorination mode, with a chlorine-evolving electrode 720 acting as a bipolar electrode.

A concentric cell, as illustrated in FIG. 7 and FIG. 8, as opposed to a plate cell, as illustrated in FIG. 5 and FIG. 6, provides an additional space saving advantage for applications requiring the use of an electrolytic cell, in a circular duct or flow path.

Figure 9:
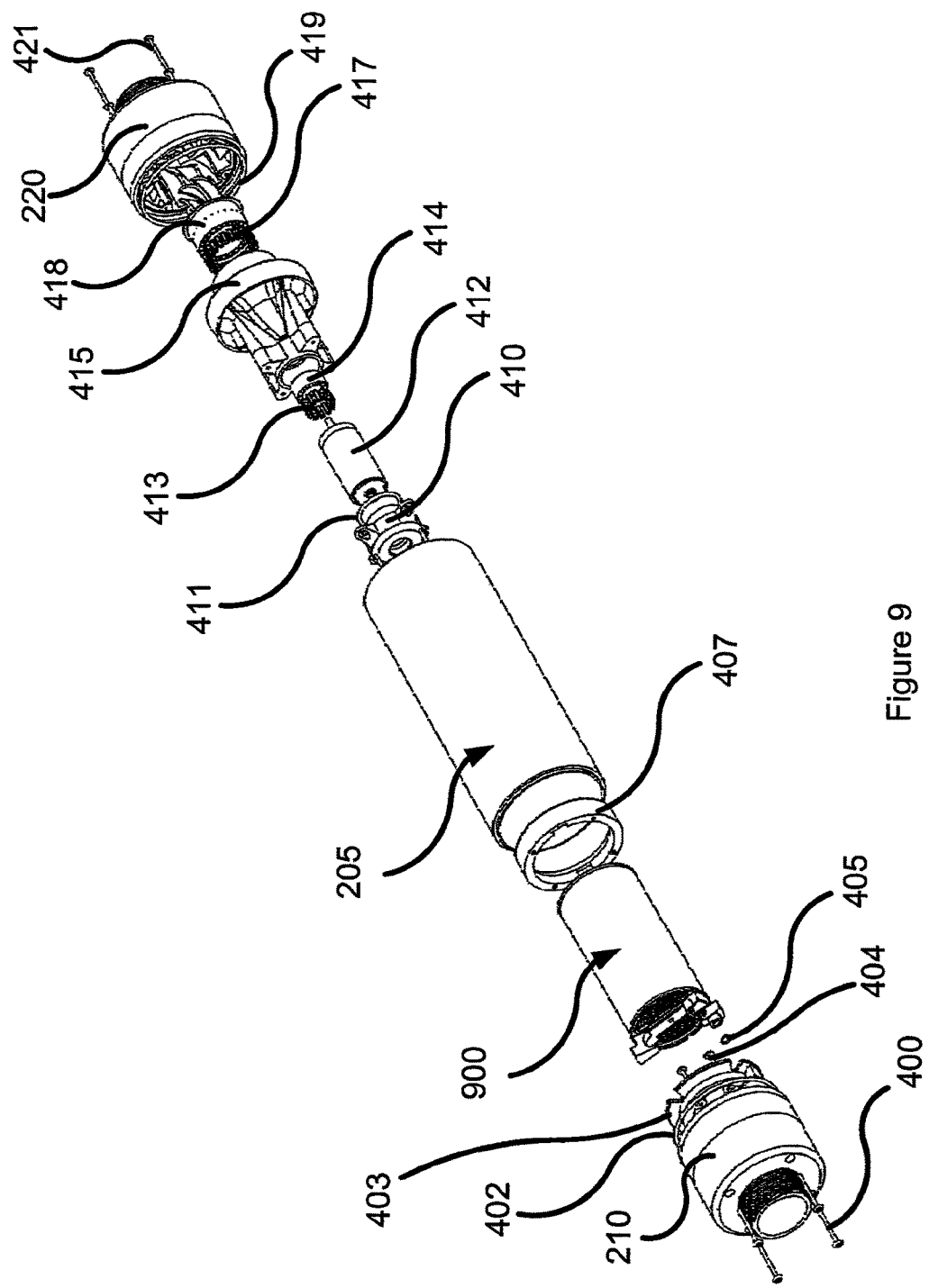
FIG. 9 is an isometric exploded view schematic of an embodiment of a water treatment system.

FIG. 9 is an isometric exploded view schematic of an embodiment of a water treatment system. In this embodiment, an exemplar implementation of a concentric hybrid electrolytic cell 900, of a design described in FIG. 7 and FIG. 8 is illustrated.

Figure 10:
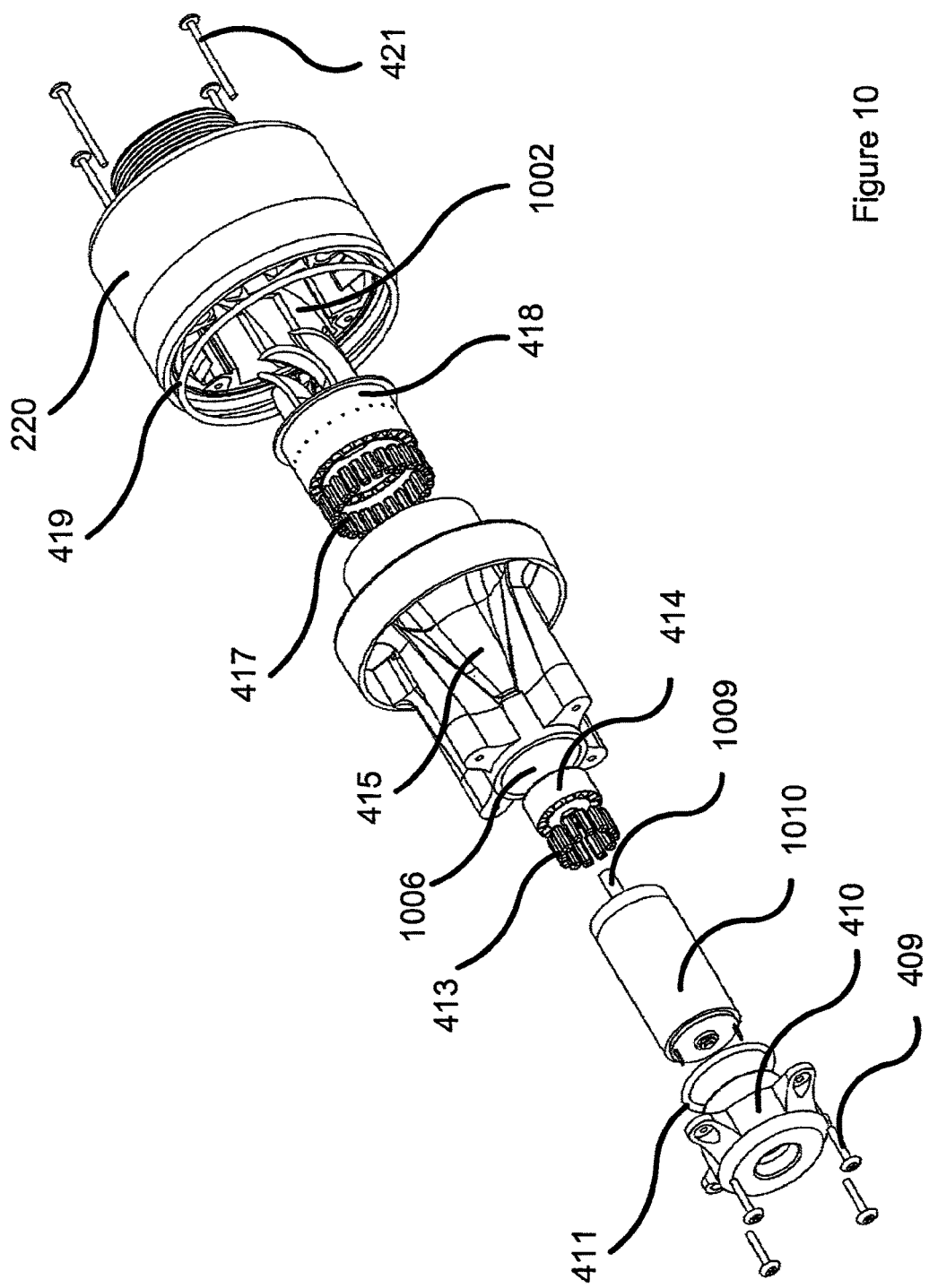
FIG. 10 is an isometric exploded view of an embodiment of a hydro generation system.

FIG. 10 is an isometric exploded view of an embodiment of a hydro generation system. A hydro generation of a water treatment system in this example requires at least an electrical generator 1010, a rotatable member 418, and a waterproof generator housing 415. An electrical generator 1010 is encapsulated inside an enclosure of a waterproof generator housing 415. A mechanical drive system allows the mechanical energy of a rotating rotatable member 418 to be transferred to the shaft of an electrical generator 1009. The design of a hydro generation system may vary and be of an impulse or reaction type. For example, a Francis turbine, a Pelton wheel, a Turgo turbine, a Kaplan turbine, or a bulb turbine may all be used. In the embodiment demonstrated in FIG. 10, the mechanical drive system is a magnetically coupled drive. However, the mechanical drive system may be a direct mechanical fastening of a rotatable member 418 to an electrical generator shaft 1009. In both types of mechanical drive system, a gearbox may additionally be installed between a rotatable member 418 and an electrical generator shaft 1009 to modify the speed of rotation and torque of the shaft as desired. In an aspect, the gearbox may be installed inside the enclosure of a waterproof generator housing 415 to facilitate its operations and durability. Additionally, a number of seals and bearings may be used as part of a mechanical drive system to facilities the rotations of the shafts and prevent or limit the leakage of the water inside a waterproof generator housing 415.

In the example illustrated in FIG. 10, Two or more magnets 413 are inserted into cavities in a magnetic coupling 414, which is a structural component holding magnets 413, creating an inner ring of magnets with a determined size and polarity arrangement desirable in a magnetically coupled drive, since a magnetically coupled drive is illustrated in this example. A magnetic coupling 414, holding magnets 413, is mechanically fastened to an electrical generator shaft 1009. The new assembly of parts 413, 414, 1009, and 1010 is inserted into an interior enclosure 1006 of a waterproof generator housing 415. A generator housing cap 410 is mechanically fastened, using mechanical fasteners 409, to a waterproof generator housing 415, compressing a compressive sealing O-ring or gasket 411 in between, and creating a waterproof enclosure within a waterproof generator housing 415.

Two or more magnets 417 are inserted into cavities in a rotatable member 418 creating an outer ring of magnets with a determined size and polarity arrangement desirable in a magnetically coupled drive, since a magnetically coupled drive is illustrated in this example. The new assembly of parts 417 and 418 are then positioned on the exterior of a waterproof generator housing 415, and held in place with a bearing to facilitate the rotations of a rotatable member 418. The new assembly is positioned, in this example, so as to allow the alignment of inner and outer magnetic rings of the magnetically coupled drive allowing the rotations of a rotatable member 418 to be transferred to an electrical generator shaft 1009. In this example, an outlet end cap 220, with embedded mechanical features 1002, such as vanes, is used to direct and accelerate the fluid to a rotatable member 418 at advantageous angles so as to maximize electrical power generation of the system.

In this example, a rotatable member 418 is positioned downstream of the electrolytic treatment system causing increased agitation to improve the mixing of useful substance(s) produced for treatment purposes by the electrolytic treatment system, increasing the performance of the treatment process.

Figure 11:
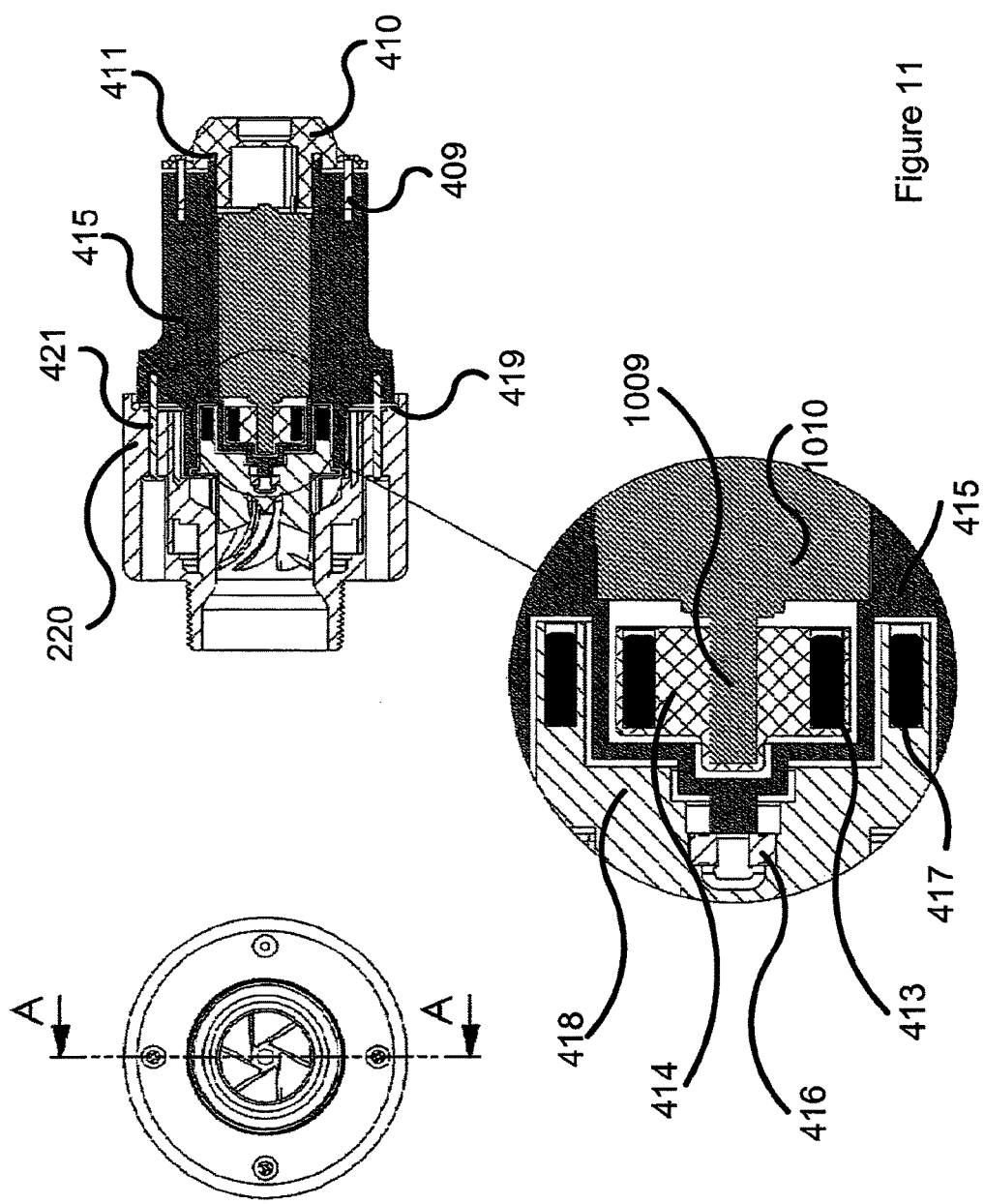
FIG. 11 is a section view of the assembled embodiment of FIG. 10 with a close-up view of a portion of the component.

Referring to FIG. 11, a section view of the assembled embodiment of FIG. 10 with a close-up view of a portion of the component is illustrated. In the assembled embodiment, inner and outer ring of magnets 413, and 417 respectively are aligned, so a rotation in a rotatable member 418, holding an outer ring of magnets 417, causes a rotation of the inner ring of magnets 413, along with a magnetic coupling 414 and an electrical generator shaft 1009. As illustrated in this example, a bearing 416, is used to facilitate the rotations of a rotatable member 418. The magnetically coupled drive is advantageous in this example because it eliminates the requirement to use a dynamic seal between a rotatable member 418 and an electrical generator shaft 1009, ensuring the enclosure within a waterproof generator housing 415 remains void of liquid at all times, extending the life of the electrical generator 1010.

Figure 12:
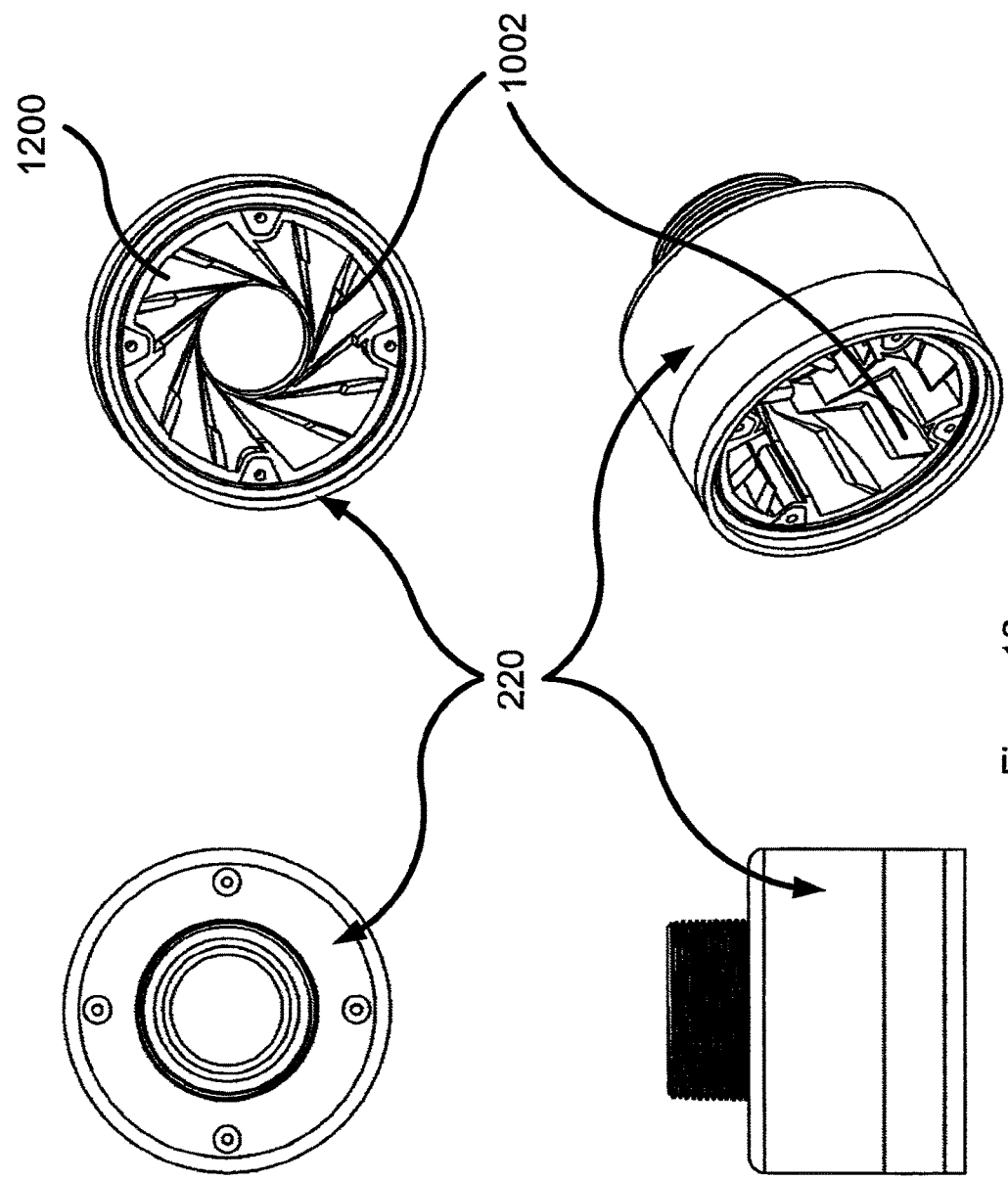
FIG. 12 is a series of schematic views of an embodiment of an outlet end cap of the embodiment of FIG. 10.

FIG. 12 is a series of schematic views of an embodiment of an outlet end cap of the embodiment of FIG. 10. In this example, embedded mechanical guide features 1002 are used to favorably direct and accelerate the fluid to a rotatable member 418 at advantageous angles so as to maximize electrical power generation of the system. In this example, mechanical guide features 1002 create cavities 1200 of determined shape and size. The fluid is directed to travel within these cavities 1200, accelerating and guided to impact a rotatable member centrally located within an outlet end cap 220. Mechanical guide features 1002 may be nozzles, vanes or other favorable shapes to achieve maximum power generation. As illustrated, an outlet end cap 220 this example, is an accessible part easily removed using mechanical fasteners. Outlet end cap 220 can also be easily replaced using mechanical fasteners in order to conveniently repair or replace a malfunctioning hydro generation system or upgrade the device with a new and more advance hydro generation system. Outlet end cap 220 can further be easily replaced, along with its embedded mechanical guide features, using mechanical fasteners to provide optimized mechanical guide performance for various liquid flow rates and pressures, to ensure maximum power generation in various conditions.

Figure 13:
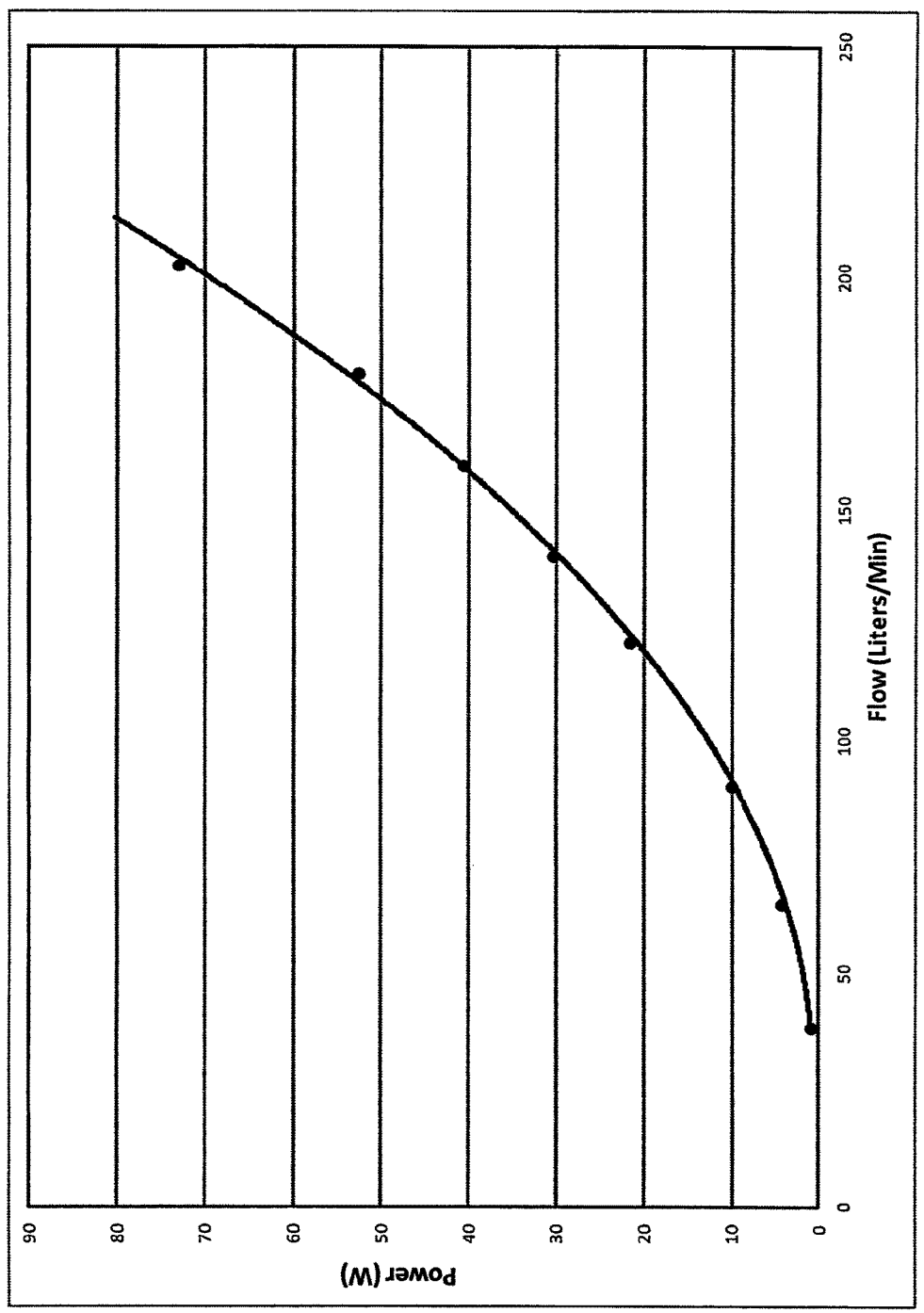
FIG. 13 is an exemplar plot of power produced by a hydro generation system vs. flow rate.

FIG. 13 is an exemplar plot of power produced by a hydro generation system vs. flow rate. The produced electrical power as shown is sufficient to operate a water treatment device, in a typical one-pass or recirculating liquid system such as swimming pool recirculation system, including an electronic control system and an electrolytic treatment system.

Figure 14:
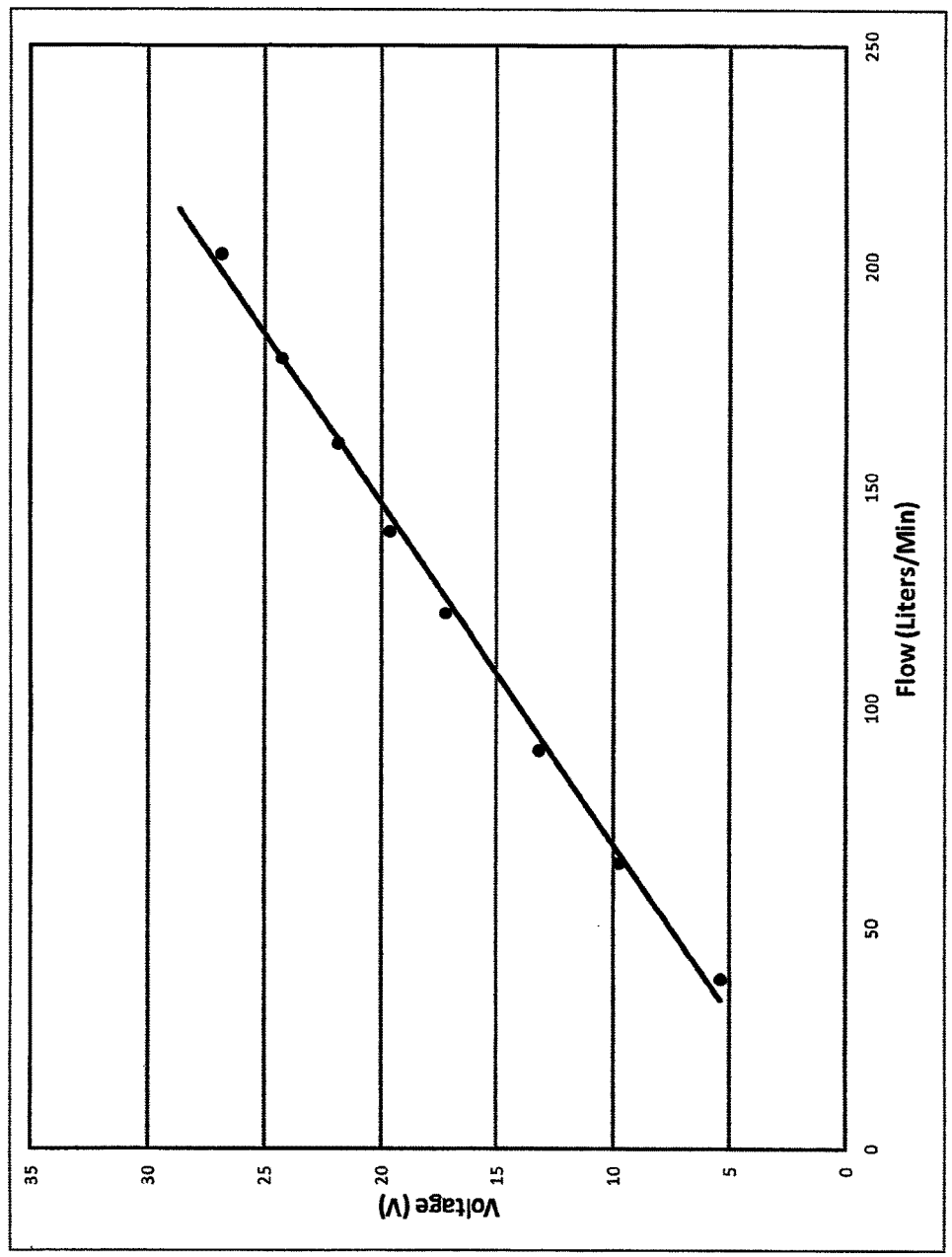
FIG. 14 is an exemplar plot of voltage produced by a hydro generation system vs. flow rate.

FIG. 14 is an exemplar plot of voltage produced by a hydro generation system vs. flow rate. The produced electrical voltage as shown is sufficient to power electronic components on an electronic control system, as well as operating electrochemical processes using electrolytic cells.

Figure 15:
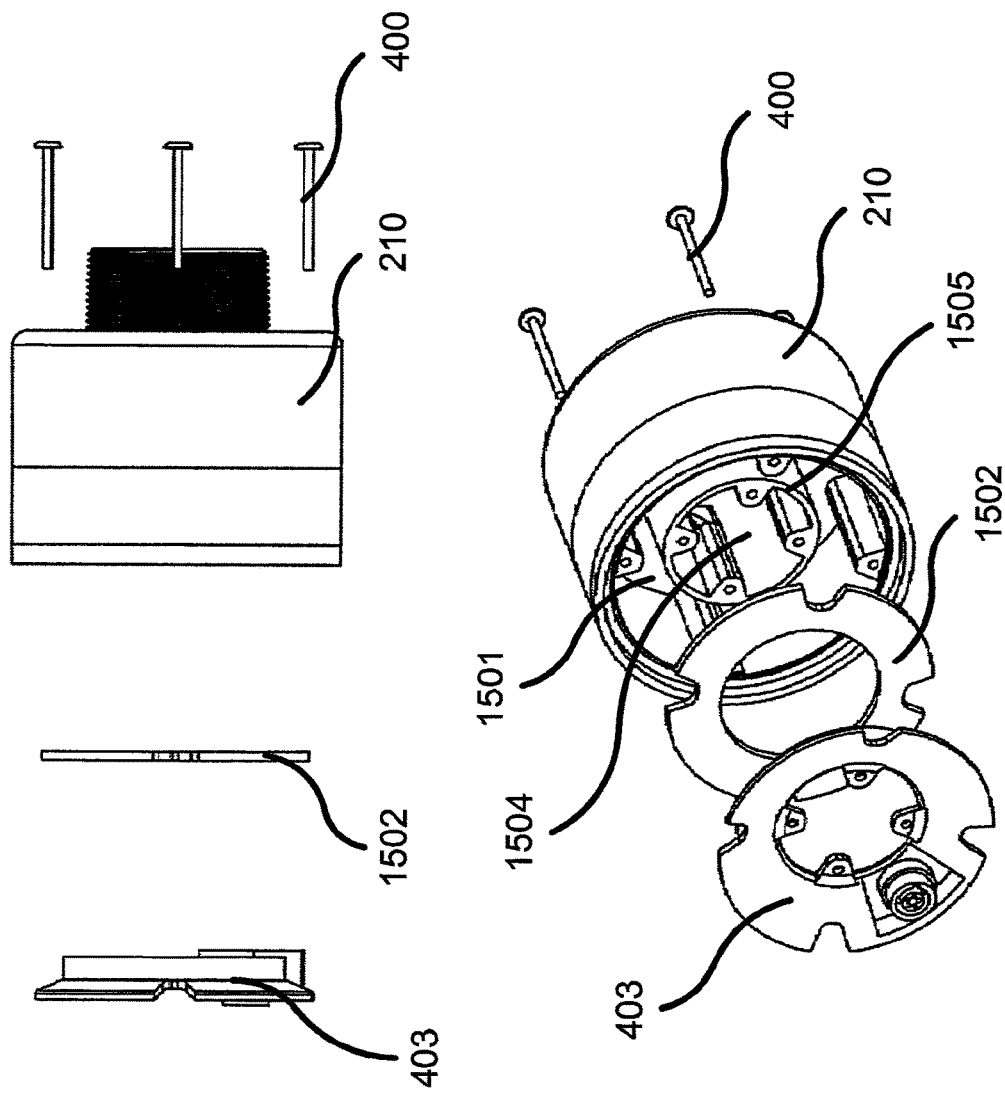
FIG. 15 is a series of schematic views illustrating an embodiment of an electronic control system location in an embodiment of an inlet end cap of the embodiment of FIG. 3.

FIG. 15 is a series of schematic views illustrating an embodiment of an electronic control system location in an embodiment of an inlet end cap of the embodiment of FIG. 3. As illustrated, an electronic control system 1502, which may include a plurality of parts including a printed circuit board, electrical leads, sensors, batteries, and other electronic components, can be inserted into a cavity 1501 within an inlet end cap 210. To protect the electronic control system 1502 from the environment and the liquid within the water treatment device, a cavity 1501 may subsequently be filled with a potting substance, solidifying and enclosing an electronic control system 1502 within. An enclosure cap 403 may also be mechanically fastened to an inlet end cap 210, covering the cavity 1501, to further protect the electronic control system 1502. Enclosure cap 403 may also enable waterproof electrical connections to be made between leads of an electronic control system 1502 and the remaining components of a water treatment device such as an electrolytic treatment system and a hydro generation system. Enclosure cap 403 may also house sensor heads, allowing sensor heads to have fluid communication with the fluid within the water treatment device, while protecting the electronic components of the sensors and sensors' connections to an electronic control system 1502 from the fluid flow. The new assembly of parts 210, 1502, and 403 provides an additional advantage of removing excess heat from an electronic control system 1502 if required. Since fluid flow, at usually lower temperatures, travels within the flow path 1504, it provides the means for removing heat from the assembly, for instance through an enclosure wall 1505. As such, the enclosure wall 1505 can be constructed from suitable material, shape, dimensions, and features to assist in the heat removal by the fluid flow from an electronic control system 1502.

Figure 16:
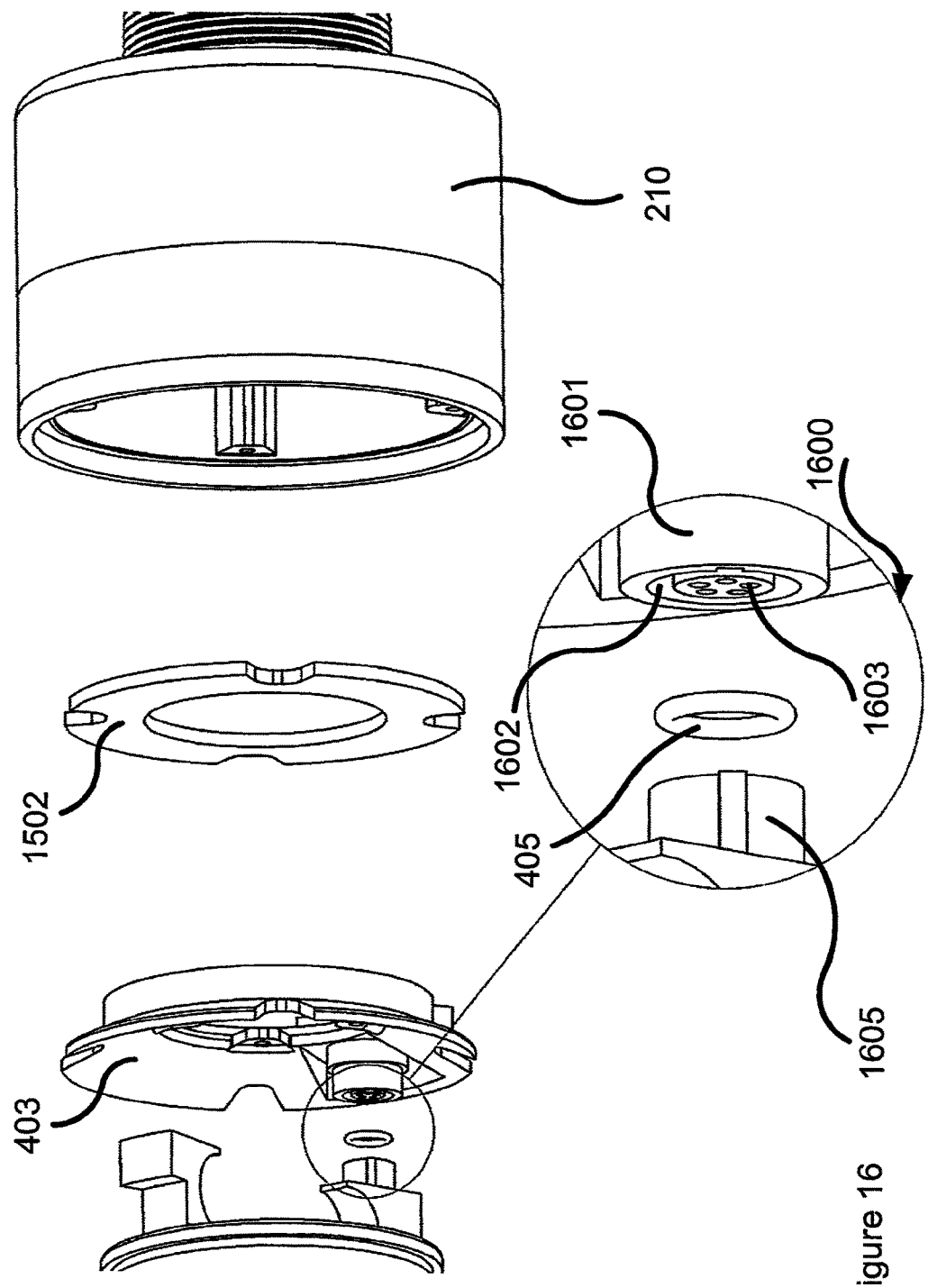
FIG. 16 is an exploded view of the embodiment of FIG. 15, with a close-up view of a portion of the component.

FIG. 16 is an exploded view of the embodiment of FIG. 15, with a close-up view of a portion of the component. In the example of FIG. 16, an embedded waterproof electrical connector 1600 is illustrated. The electrical connector 1600 enables an inlet end cap 210 and associated electronic parts 1502, and 403 to be automatically disconnected and connected to the rest of the system, when the assembly is removed or replaced by the user using mechanical fasteners. This feature promotes user convenience, as the user is able to replace or upgrade an electronic control system 1502 of the system by simply replacing the easily accessible assembly of parts 210, 1502, and 403. This feature also improves user convenience by enabling the user to easily inspect, remove, or replace an electrolytic treatment system of the water treatment device, by easily removing the assembly of parts 210, 1502, and 403.

Referring to FIG. 16, electrical connector 1600 is constructed from a plurality of parts. A mechanical feature embedded on an enclosure cap 403, a female connector 1601 houses one or more conductive contacts 1603 and a compressive O-ring or gasket groove 1602. A compressive sealing O-ring or gasket 405 is inserted into a compressive O-ring or gasket groove 1602. A male connector 1605 creates an accompanying part of electrical connector 1600.

Figure 17:
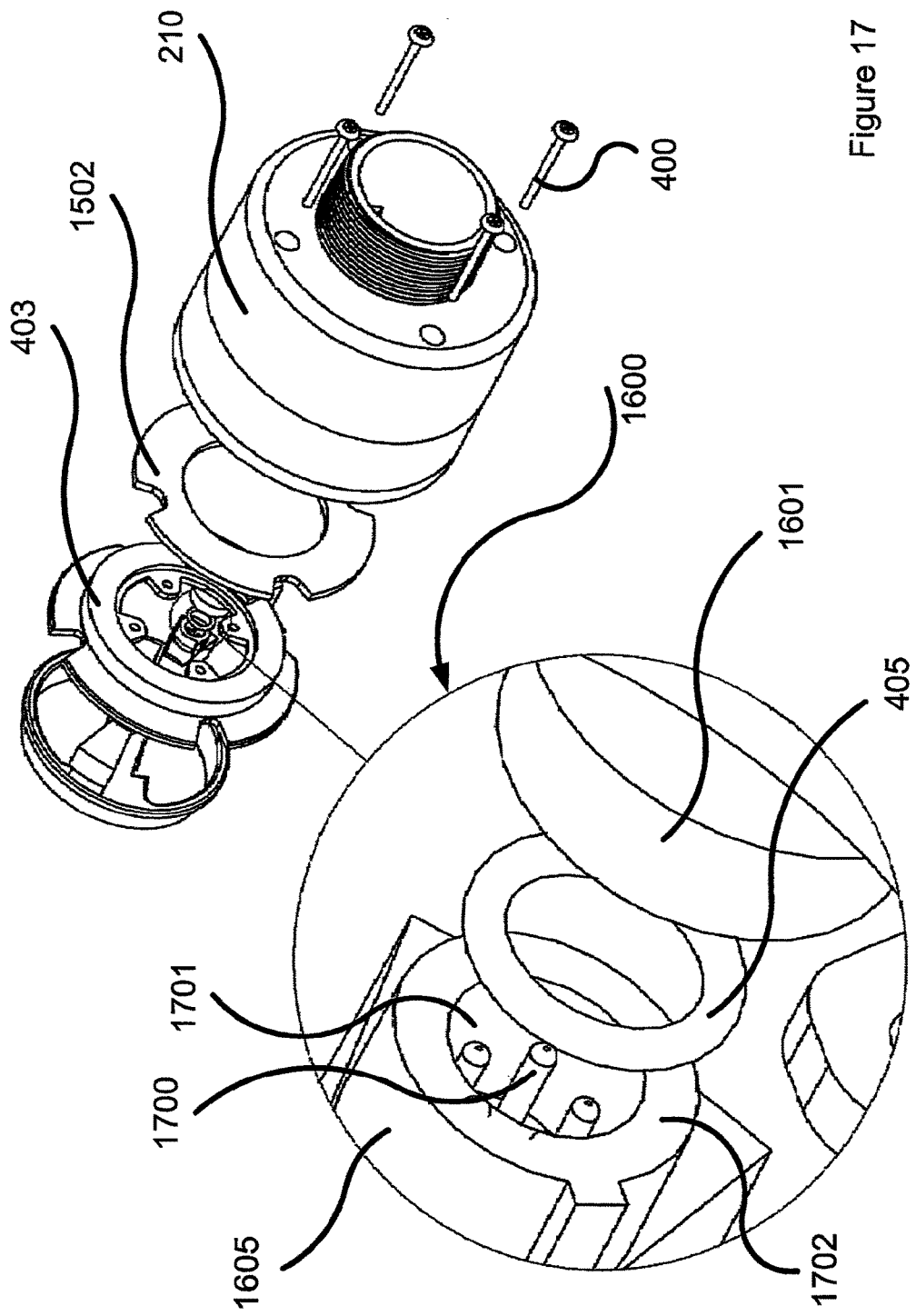
FIG. 17 is an exploded view of the embodiment of FIG. 15, with a close-up view of a portion of the component.

FIG. 17 is an exploded view of the embodiment of FIG. 15, with a close-up view of a portion of the component. FIG. 17 illustrates the design of a male connector 1605 in this example. Male connector 1605 is constructed from a plurality of parts, including one or more conductive contacts 1700, a waterproof chamber 1701, and a surface 1702. When the assembly of parts 210, 1502, and 403 is mechanically fastened to the water treatment device, surface 1702 compresses a sealing O-ring or gasket 405 to a groove 1602, creating a waterproof chamber within the connector enclosing the electrical connections. Electrical connections are automatically created by direct contact between conductive contacts 1700 and 1603 in the closed position.

A method is presented for determining speed of rotation of a rotatable member, speed of rotation of electrical generator shaft, and flow rate of fluid travelling through the device.

Figure 18:
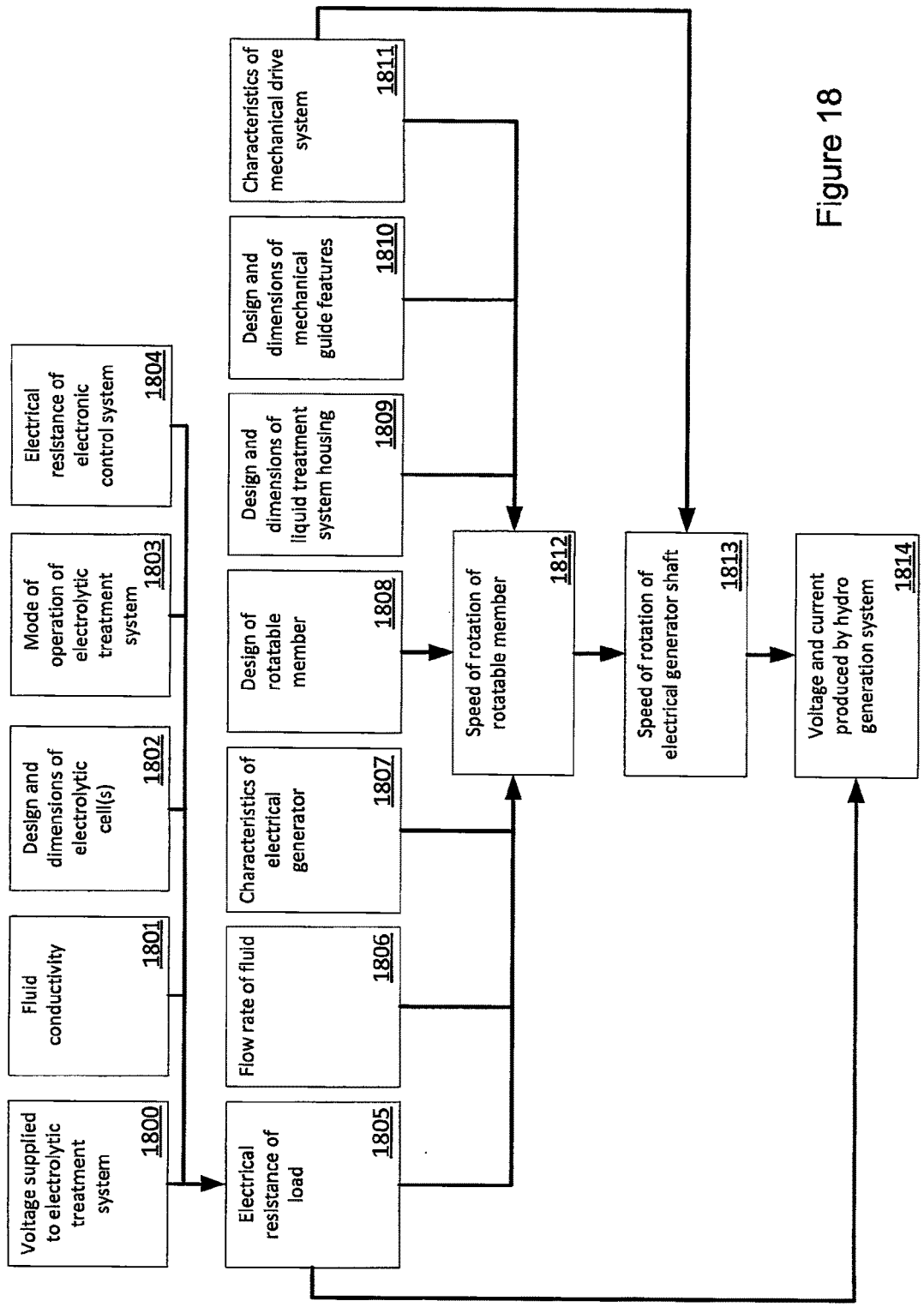
FIG. 18 is a block diagram illustrating the variables affecting the voltage and current produced by an embodiment of a hydro generation system.

FIG. 18 is a block diagram illustrating the variables affecting voltage and current produced by an embodiment of a hydro generation system. In the example of FIG. 18, major contributing variables have been shown. Electrical resistance of load 1805, as sensed by an electrical generator, is dependent on electrical resistance of electronic control system 1804, and electrical resistance of electrolytic treatment system. Electrical resistance of electrolytic treatment system is still dependent on a number of variables. Voltage supplied to electrolytic treatment system 1800 is a fundamental variable in determining electrochemical reactions occurring in electrolytic treatment system and directly affects the electrical resistance of electrolytic treatment system. Fluid conductivity 1801 is dependent on chemical composition and electrical characteristics of the liquid. Design and dimensions of electrolytic cell(s) 1802 includes variables such as number of electrodes, electrode spacing and active surface area during the electrolytic operation. Mode of operation of electrolytic treatment system 1803, for example whether all available electrodes are active or some have been switched off also affects electrical resistance of electrolytic treatment system, and therefore, electrical resistance of load 1805 as sensed by an electrical generator.

Electrical resistance of load 1805 affects speed of rotation of rotatable member 1812, for example by increasing the torque on the shaft of an electrical generator. Speed of rotation of rotatable member is directly dependent on flow rate of fluid 1806 travelling through the device. Characteristics of electrical generator 1807, such as size, type, and electrical properties, also affect speed of rotation of rotatable member 1812 by impacting the torque on electrical generator shaft. Design of rotatable member 1808 is also a significant variable impacting speed of rotation of rotatable member 1812. For example, the type of rotatable member such as a Pelton wheel, Francis type runner, or a Kaplan type runner is an important factor. Moreover, the diameter and size of rotatable member significantly impacts speed of rotation of rotatable member 1812. Design and dimensions of liquid treatment system housing 1809 such as housing diameter, and design and dimensions of mechanical guide features 1810, such as feature shape, size, and number of features, impact speed of rotation of rotatable member 1812 by accelerating and directing the impact of fluid flow to a rotatable member. Finally, characteristics of mechanical drive system 1811, such as a gearbox, impacts speed of rotation of rotatable member 1812 by influencing torque of rotatable member and adding friction forces to the system.

Speed of rotation of electrical generator shaft is in turn directly dependent on speed of rotation of rotatable member 1812 and characteristics of mechanical drive system 1811. For example a speed of rotation of rotatable member 1812 at 1000 rpm, with a mechanical drive system that utilizes a gearbox with a 3 to 1 speed ratio, results in a speed of rotation of electrical generator shaft 1813 of 3000 rpm.

Finally, voltage and current produced by a hydro generation system 1814, and thus the electrical power produced, is directly dependent on speed of rotation of electrical generator shaft 1813 and electrical resistance of load 1805, as sensed by electrical generator. For example, a particular electrical generator when connected to a load with an electrical resistance of 10 ohms will always produce the same voltage and current, when the electrical generator shaft is rotated at 3000 rpm.

A method is presented for determining speed of rotation an electrical generator shaft, speed of rotation of a rotatable member and, flow rate of fluid in a water treatment device, based on data measured from a hydro generation system. Flow rate data is valuable information to be relayed to the user to understand and better operate their facility. It can be used in a one-pass liquid system to achieve chemical concentration control. In a recirculating system, it can be used to calculate the turnover rate of a recirculation system and optimize the performance of a water treatment system according to the turnover rate. Historical flow rate data can be stored on an electronic control system and determine if flow rate is declining due to a number of factors such as filtration system clogging and notify the user of that disturbance. Historical flow rate data can be stored on an electronic control system and determine the historical hours of operations of a pump in a recirculating system. A processor can proceed to determine the optimized hours of operation required and recommend the change to the user in order to improve performance, and reduce electrical power use by a pump.

Figure 19:
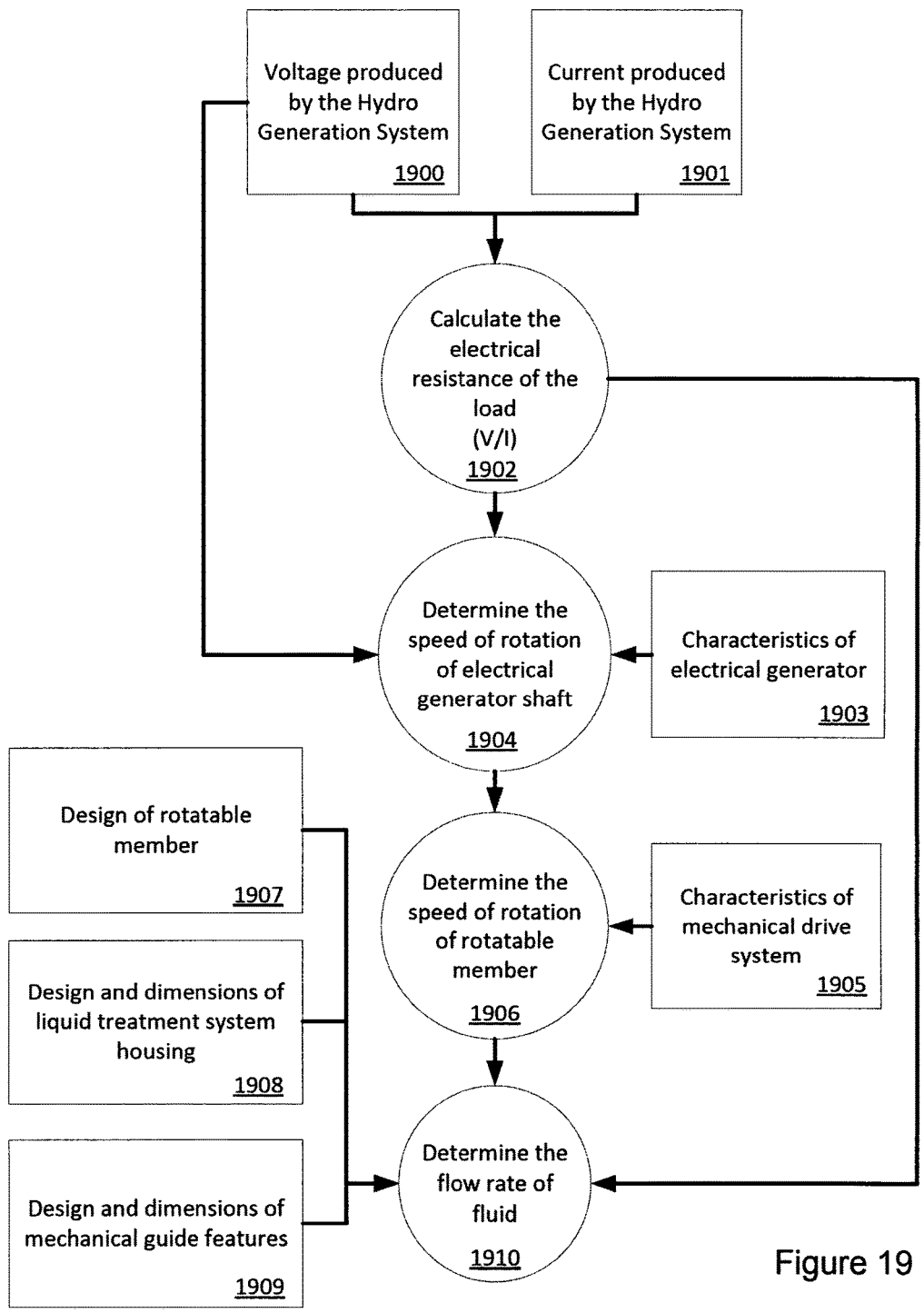
FIG. 19 is a block diagram illustrating a method for determining the speed of rotation of electrical generator shaft, speed of rotation of the rotatable member, and flow rate of fluid.

FIG. 19 is a block diagram illustrating a method for determining the speed of rotation of electrical generator shaft, speed of rotation of the rotatable member, and flow rate of fluid. Referring to relationships described in FIG. 18, a method is presented to accurately measure speed of rotation of electrical generator shaft, speed of rotation of the rotatable member, and flow rate of fluid within a water treatment device. Electrical voltage 1900 and current 1901 are measured by instruments on an electronic control system and are provided to a processor. Processor will proceed to calculate electrical resistance of load 1902 by dividing voltage 1900 by current 1901. Processor has access to information about characteristics of electrical generator 1903, for example in the form of a database of voltage, current and power values for a range of electrical generator shaft speeds, for a series of electrical resistance values, obtained through calibration testing. Alternatively, the information can be stored in the form of a series of mathematical relationships for discrete particular values of electrical resistance, calculating the voltage, current, and power produced by electrical generator at a range of electrical generator shaft speeds. A number of mathematical methods, such as regression models can be used to simplify and store the information. Processor then proceeds to determine the speed of rotation of electrical generator shaft 1904 by comparing the voltage, current or power produced by generator at the electrical resistance determined in step 1902 against values stored in a database. Alternatively, the mathematical relationships can be used to calculate speed of rotation of electrical generator shaft 1904, based on electrical resistance 1902 and voltage, current or power produced. In the example of FIG. 19, electrical voltage 1900 is used to determine speed of rotation of electrical generator shaft 1904.

Speed of rotation of rotatable member 1906 is determined partly based on speed of rotation of electrical generator shaft 1904. Information about characteristics of mechanical drive system 1905 is available for use by processor. The information can at least include the speed ratio between speed of rotation of electrical generator shaft and rotatable member. In case of a direct mechanical connection between rotatable member and electrical generator shaft the speed ratio is one and speeds are equal. In the case that a gearbox is used, speed ratio will be different and is used to determine speed of rotation of rotatable member 1906.

Finally, to determine the flow rate of fluid 1910 based on a speed of rotation of rotatable member 1906, information about the design of rotatable member 1907, design and dimensions of liquid treatment housing 1908, and design and dimensions of mechanical guide features 1909, and the electrical resistance of load 1902 are needed to be available to a processor.

This information is available at the time of manufacturing and can be determined through calibration testing by installing a device to be calibrated on a test rig that circulates fluid at a known rate, and mapping the electrical output of the hydro generation system across a range of fluid flow rates, at various electrical resistances of the load, to correlate the various fluid flow rates with the speed of rotation of the rotatable member 1906.

This correlation, in this example, is used to determine flow rate of fluid 1910, based on speed of rotation of rotatable member 1906. Other factors, such as viscosity, density and temperature of fluid can influence this correlation, and can be taken into account where these factors are variable. However for most applications, these factors can be assumed constant to simplify the calculations and reduce the amount of information required to be stored on an electronic control system.

Figure 20:
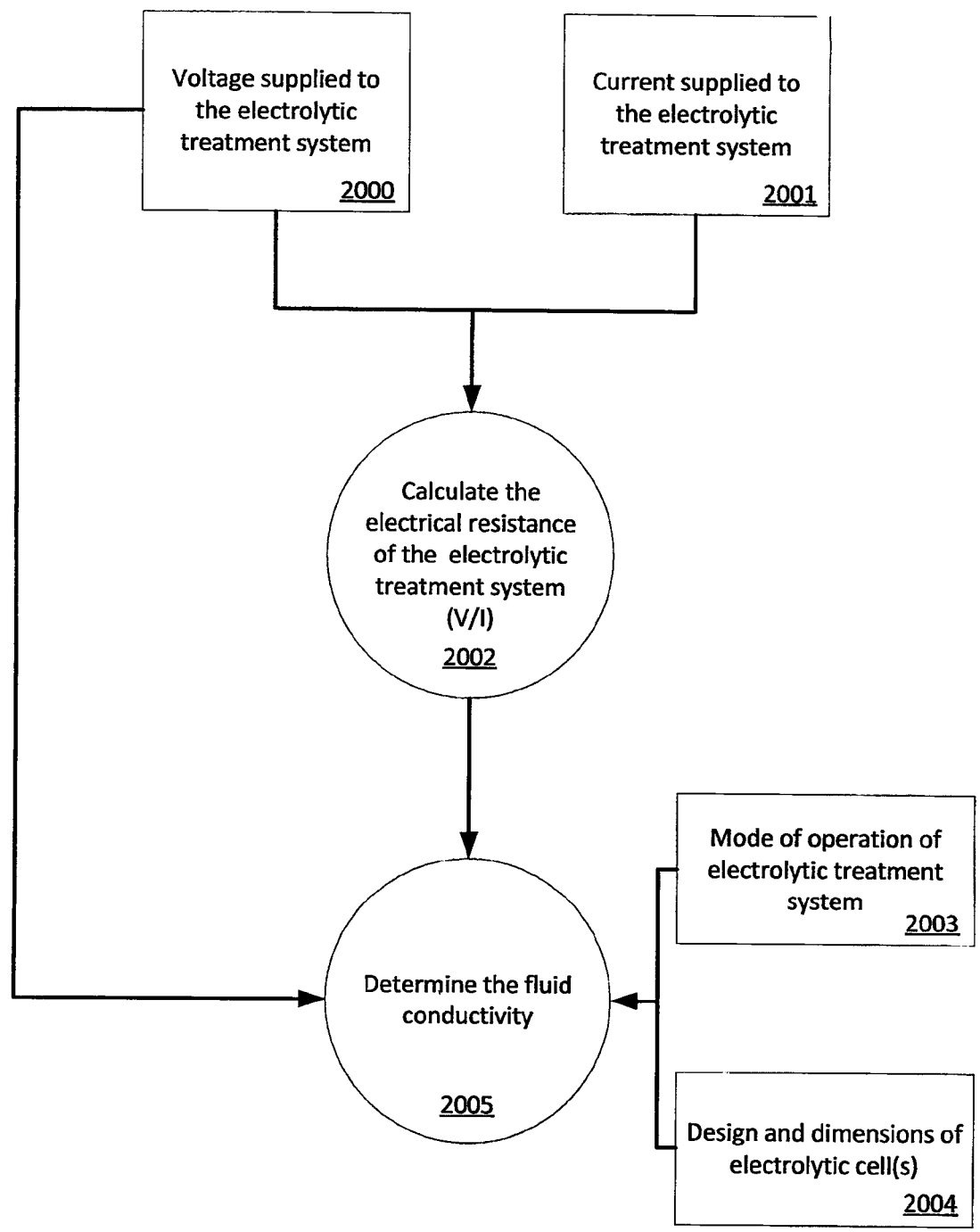
FIG. 20 is a block diagram illustrating a method for determining the electrical conductivity of a fluid.

FIG. 20 is a block diagram illustrating a method for determining the electrical conductivity of a fluid. Referring to relationships described in FIG. 18, a method is presented to accurately measure fluid conductivity within a water treatment device. Fluid conductivity can be used to estimate salinity of fluid which might be beneficial in some applications. Voltage 2000 and current 2001 supplied to an electrolytic treatment system are measured by instruments on an electronic control system and are provided to a processor. Processor will proceed to calculate electrical resistance of electrolytic treatment system 2002 by dividing voltage 2000 by current 2001. Processor also has access to updated information about mode of operation of electrolytic treatment system 2003. For example, in a case where a hybrid electrolytic treatment cell is used (as described previously), current mode of operation (ionization, salt chlorination, or simultaneous operation) is available to the processor. Moreover, information about design and dimensions of electrolytic cell(s) 2004 is available to the processor. This information may include electrode spacing, active surface area, number of electrodes and cell constant. This information is stored in a database, for example, and can include a series of values representing design and dimensions of electrolytic cells active in each mode of operation. Therefore, based on a determination of current mode of operation 2003, a processor can determine design and dimensions of the currently active electrolytic cell, such as the active cell constant. Subsequently, a processor can determine the fluid conductivity 2005 through an analytical resistance calculation, based on cell constant of the active electrolytic cell and the calculated electrical resistance of electrolytic treatment system 2002. In practical applications, it might be beneficial, in order to obtain more accurate results, to store a series of experimental values or correlations in a database, describing fluid conductivity as a function of electrical resistance of the electrolytic treatment system 2002, active electrolytic cell in operation, and voltage, current or power supplied to the electrolytic treatment system. In the example of FIG. 20, electrical voltage supplied to the electrolytic treatment system 2000 is used, along with electrical resistance 2002, and information about active mode of operation 2003 and design and dimensions of active electrolytic cell(s) 2004 to determine the fluid conductivity 2005 based on experimental values stored in a database.

Figure 21:
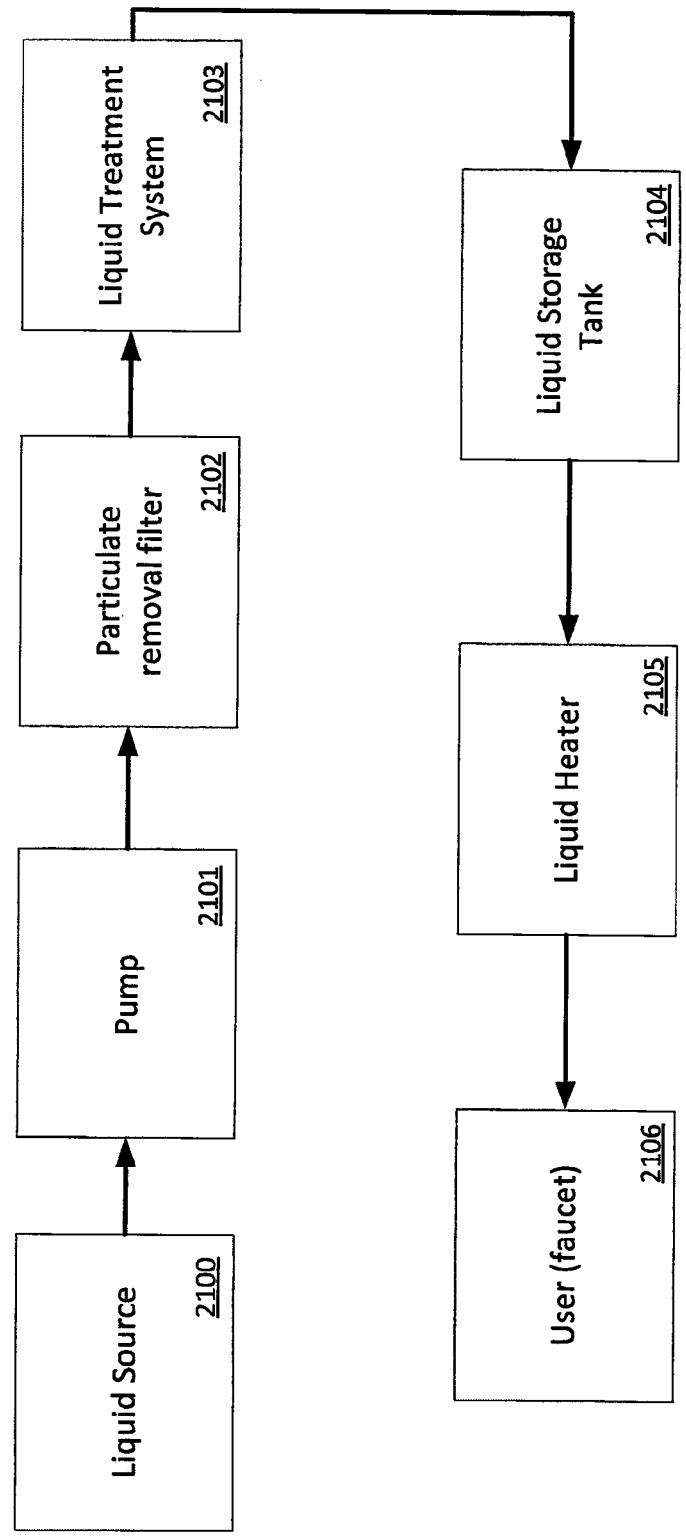
FIG. 21 is an exemplar block diagram of a one-pass liquid distribution system, employing an embodiment of a water treatment system.

FIG. 21 is an exemplar block diagram of a one-pass liquid distribution system, employing an embodiment of a water treatment system. In a one-pass system, a liquid is usually passed through a liquid treatment system 2103 once as it travels from the source 2100 to the point of use 2106. In the example of FIG. 21 there are a number of other equipment and systems, including one or more pumps 2101 to pressurize the fluid, one or more filters 2102 to eliminate or reduce particulate matter, one or more liquid storage tanks 2104 and one or more liquid heaters 2105 to heat the liquid for usage. Depending on the requirements of the system any number of equipment can be installed either before or after the liquid treatment system 2103. Other systems and fittings such as valves and instruments can also be installed in the system. The system may also have more than one liquid source and point of use. Branches to these sources or points of usage can be made at any location on the one-pass system, but preferable points of usage would be taken after the liquid treatment system 2103.

Figure 22:
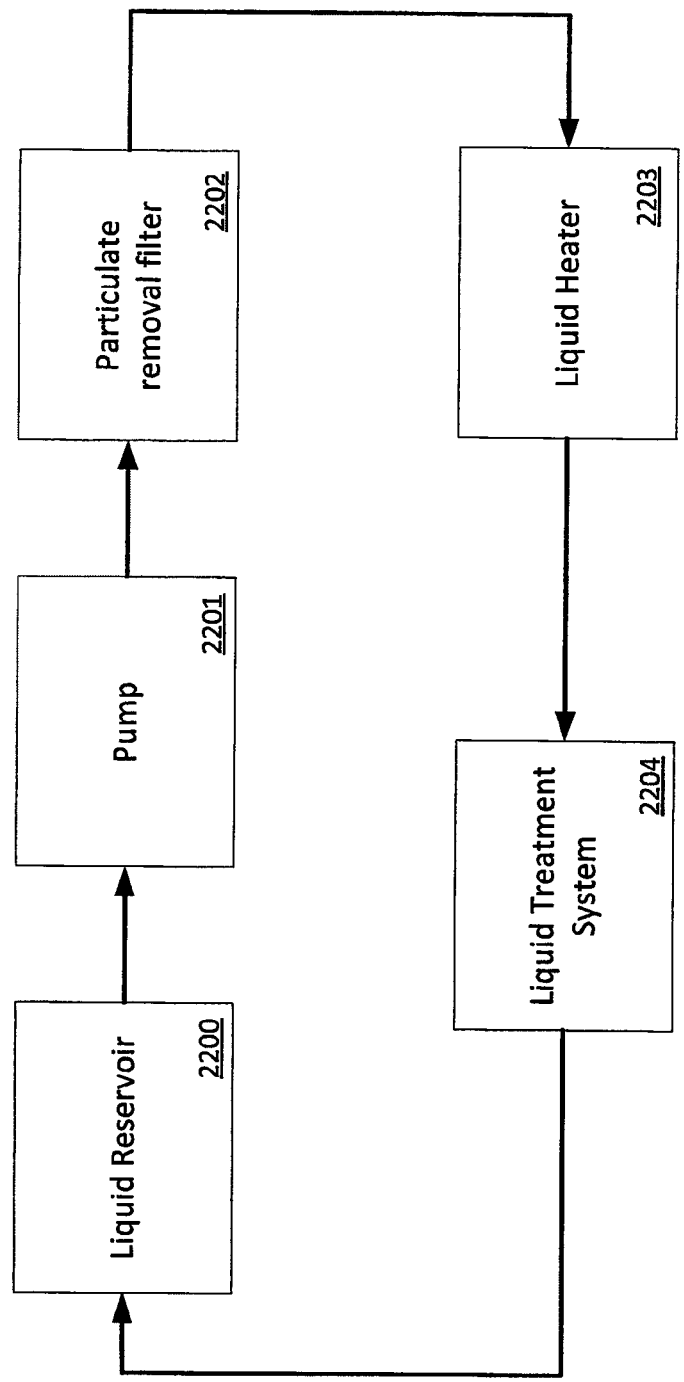
FIG. 22 is an exemplar block diagram of a liquid recirculation system, employing an embodiment of a water treatment system.

FIG. 22 is an exemplar block diagram of a liquid recirculation system, employing an embodiment of a water treatment system. In a recirculating system, a liquid is often continually passed through a liquid treatment system 2204 as it is recycled in the system, with the majority of the fluid being stored in a liquid reservoir 2200. In the example of FIG. 22 there are a number of other equipment and systems, including one or more pumps 2201 to recirculate the fluid, one or more filters 2202 to remove or reduce particulate matter, and one or more liquid heaters 2203 to heat the liquid in the reservoir 2200. Other systems and fittings such as valves and instruments can also be installed in the system. The system may also have more than one liquid reservoir 2200 or it may have a number of inlets and outlets from the system to introduce fresh liquid or purge existing liquid from the system. The inlet and outlet branches can be installed as required within the system.

Figure 23:
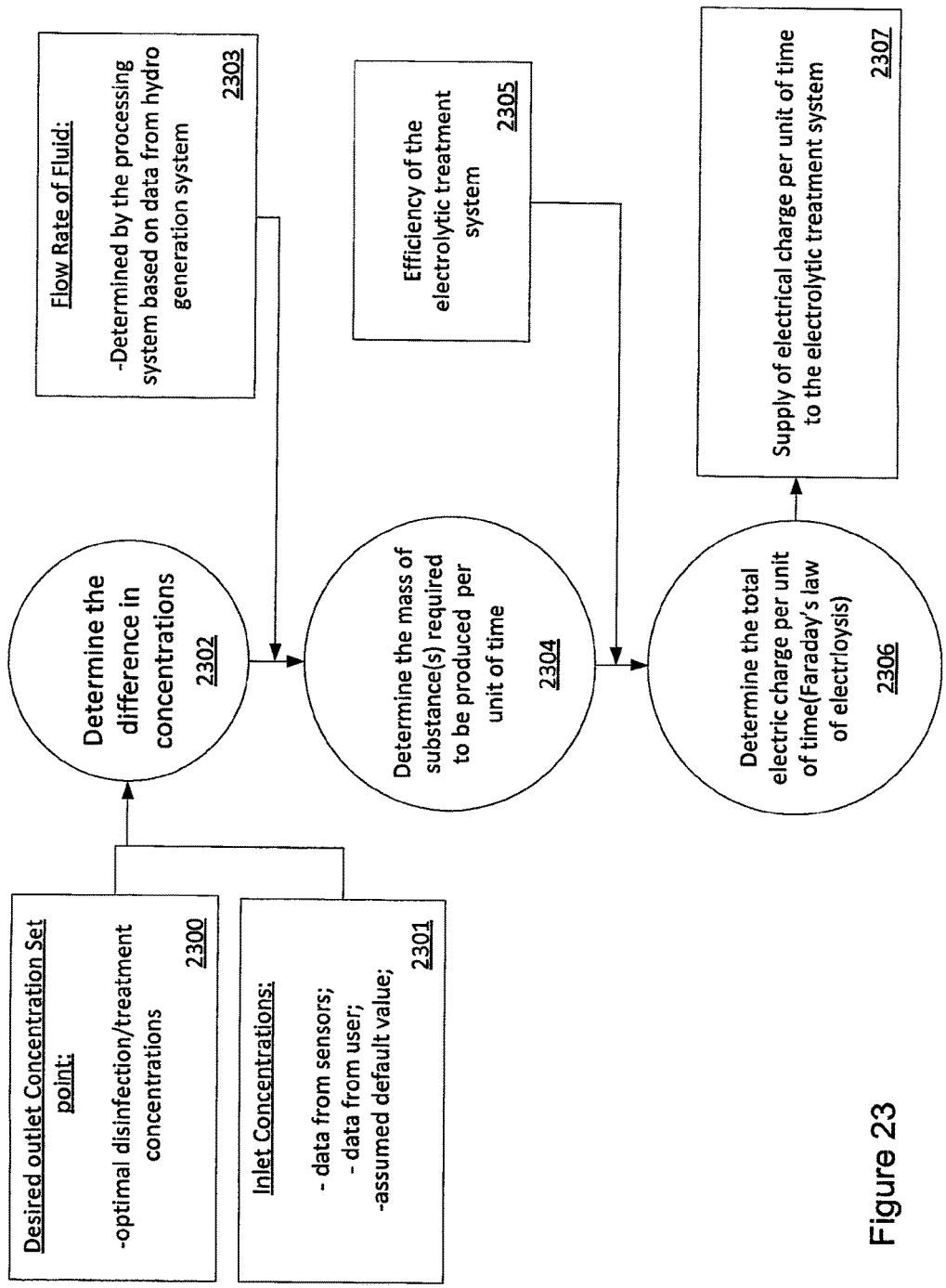
FIG. 23 is a block diagram illustrating a method for controlling the chemical concentrations in the outlet stream of an embodiment of a liquid treatment system in a one-pass arrangement.

FIG. 23 is a block diagram illustrating a method for controlling the chemical concentrations in the outlet stream of an embodiment of a liquid treatment system in a one-pass arrangement. This method can be used and executed by a processor within an electronic control system to ensure chemical concentrations of useful substance(s) for treatment purposes are at optimal levels in the stream leaving a water treatment device. Desired outlet concentration set point(s) 2300 of one or more substances are provided to a processor. Moreover, processor has access to information regarding the inlet concentrations 2301 of target chemicals. This information can be in the form of data from sensors, or data input by a user through a communication system. It can also be a default value, considered to be accurate for a specific condition. For example, concentrations of copper and silver in most natural water sources are miniscule. Therefore, for most applications, it is reasonable to assign a default value of zero for inlet concentrations 2301. A process can determine the difference 2302 in desired concentrations 2300 and inlet concentrations 2301. Flow rate of fluid 2303 can be determined by an electronic control system, as described earlier. A processor can subsequently determine the mass of substance(s) required to be produced per unit of time, by multiplying flow rate of fluid 2303 by the difference in concentrations 2302. For example, if the concentration of copper ions needs to increase by 0.4 mg per liter and a flow rate of 10 liters per minute is calculated, 4 mg of copper need to be produced per minute to achieve the desired concentration. Information about the efficiency of electrolytic treatment system 2305 is available to the processor.

This information can be in the form of a database of efficiency values for various operating conditions and parameters and describes how efficiently the electrochemical process converts the supplied electrical charge to mass of desired product. Processor then determines the total electrical charge per unit of time 2306 based on mass of substance (s) to be produced 2304 and efficiency data 2305, according to faraday' law of electrolysis. Processor will subsequently provide a signal to electronic components within an electronic control system to adjust the supply of electrical charge per unit of time 2307 to an electrolytic treatment system to match the determined required total electrical charge per unit time 2306. Components within an electronic control system can achieve the desired supply of total electrical charge per unit of time to electrolytic system by regulating the electrical current supplied or they may use a timer and a current sensor to control the duration of supply of unregulated electrical current in order to achieve the desired supply of total electrical charge per unit of time.

1) A liquid treatment system comprising: A housing to be mounted in-line or at the end of a liquid flow path; An electrolytic treatment system disposed within the housing to produce useful substance(s) for treatment purposes; A hydro generation system disposed within the housing with a rotatable member designed to be rotated by the flow of liquid and produce enough electrical power to operate the liquid treatment system; An electronic control system disposed within a sealed waterproof enclosure in the housing designed to at least:
   a. Receive and manage the electrical power produced by the hydro generation system; and
      i. Control the output of the electrolytic treatment system by controlling the electrical power transferred to the electrolytic treatment system.

2) A system according to 1) wherein the electrolytic treatment system is a salt chlorination electrolytic cell, capable of producing chlorine useful for liquid treatment purposes.

3) A system according to 1) where the electrolytic treatment system is a metal ionization electrolytic cell, capable of producing metallic ions useful for liquid treatment purposes.

4) A system according to 1) where the electrolytic treatment system includes two separate electrolytic cells, each comprising of at least two electrodes, where:
   a. A first electrolytic cell is a salt chlorination electrolytic cell, capable of producing chlorine useful for liquid treatment purposes; and
   b. A second electrolytic cell is a metal ionization electrolytic cell, capable of producing metallic ions useful for liquid treatment purposes.

5) A system according to 1) where the electrolytic treatment system is a hybrid electrolytic cell, capable of producing both chlorine and metallic ions useful for liquid treatment purposes either (i) simultaneously, or (ii) independently, comprising of at least three electrodes, where:
   a. A first ionization electrode is made from a sacrificial metallic element or alloy suitable for metal ionization process;
   b. Two or more chlorine-evolving electrode are adjacent to the first electrode, made from a material suitable for salt chlorination process;

c. The first ionization electrode and at least the first and the last chlorine-evolving electrodes are each separately connected to the electronic control system;
d. The electronic control system is capable of switching off and/or changing the polarity of each electrode so that it can activate:
  i. The metal ionization process independently by making the first ionization electrode positive and at least the first adjacent chlorine-evolving electrode negative; or
  ii. The salt chlorination process independently by making the metal ionization electrode negative and at least one of the chlorine-evolving electrodes positive; or
  iii. The salt chlorination process independently by switching off the metal ionization electrode and making a first chlorine-evolving electrode positive and a last chlorine-evolving electrode negative; or
  iv. The metal ionization and salt chlorination processes simultaneously by making the metal ionization electrode positive and the last chlorine-evolving electrode farthest away from the metal ionization electrode negative.

6) A system according to 5) where the hybrid electrolytic treatment system is made of plate electrodes, mesh electrodes, or concentric tubes.

7) A system according to 1) where the electrolytic treatment system can be an accessible component within the liquid treatment system housing to be easily replaced using mechanical fasteners.

8) A system according to 1) where the design of the electrolytic treatment system allows waterproof electrical connections to be disconnected and reconnected automatically when the electrolytic treatment system is replaced.

9) A system according to 1) where the hydro generation system consists of:
a. A rotatable member designed to be rotated by the flow of fluid;
b. An electrical generator designed to convert the mechanical energy of the rotational movement of the rotatable member to electrical energy;
c. A mechanical drive system designed to transfer the mechanical energy of the rotatable member to the shaft of the electrical generator;
d. A waterproof generator housing internal to the flow path of liquid within the housing of the liquid treatment system to prevent direct contact between the fluid and the electrical generator.

10) A system according to 9) where the hydro generation system also consists of mechanical guide features within the housing of the liquid treatment system to direct the flow of fluid to the rotatable member to maximize the electrical power generated by the hydro generation system.

11) A system according to 10) where the mechanical guide features are embedded within an easily accessible part of the liquid treatment system housing to be easily replaced using mechanical fasteners, so as to allow the use of optimized mechanical guide features for various flow rates and fluid pressures for maximum power extraction and generation by the hydro generation system.

12) A system according to 9) where the mechanical drive system functions by either (i) direct mechanical attachment the rotatable member to a rotatable shaft connected to the electrical generator or (ii) the means of a magnetically coupled drive transferring the mechanical rotations of the rotatable element to a rotatable shaft connected to the electrical generator.

13) A system according to 9) where the use of a magnetically coupled drive eliminates the need for a dynamic seal between the rotatable element and a rotatable shaft connected to the electrical generator, usually required to avoid the entrance of a fluid to the waterproof generator housing.

14) A system according to 9) where the mechanical drive system utilizes a gearbox within the waterproof generator housing designed to modify the speed of rotation and torque of the electrical generator shaft.

15) A system according to 1) where the rotation of rotatable member of the hydro generation positioned downstream of the electrolytic treatment system causes increased agitation to improve the mixing of useful substance(s) produced for treatment purposes by the electrolytic treatment system, increasing the performance of the treatment process.

16) A system according to 1) where the electronic control system includes: A power management circuit managing the electrical power produced and received from the hydro generation system by: Allocating and converting a portion of the electrical power produced for internal electronic functions and components at suitable voltages; Allocating the remainder of the electrical power to be used by the electrolytic treatment system; One or more central processing units; Storage system; Communications and input/output modules;

17) A system according to 16) where the electronic control system also includes a user display and a user input system.

18) A system according to 16) where the electronic control system also includes a sensor unit with one or more sensors in contact with the liquid within the housing to provide feedback for the electronic control system.

19) A system according to 18) where the sensor unit includes a temperature sensor.

20) A system according to 18) where the sensor unit includes a pH sensor.

21) A system according to 18) where the sensor unit includes an ORP sensor.

22) A system according to 18) where the sensor unit includes a conductivity sensor.

23) A system according 18) where the sensor unit includes an ion-selective sensor.

24) A system according to 1) where the sealed waterproof enclosure housing the electronic control system can be an accessible part of the liquid treatment system housing to be easily replaced using mechanical fasteners.

25) A system according to 24) where the design of the electrical connections from the electronic control system within the sealed waterproof enclosure to the electrical generator and the electrolytic treatment system allows waterproof connections to be disconnected and reconnected automatically when the sealed waterproof enclosure is mechanically removed and reattached.

26) A liquid distribution system employing the liquid treatment system in 1) in a one-pass arrangement where the liquid to be treated is passed through the liquid treatment system only once while travelling from the source to the point of use, comprising: A liquid flow path in which the flow of liquid is made possible through gravity or a pump;

27) The liquid treatment system of 1) installed in-line or at the end of the said liquid flow path.

28) A liquid recirculation system employing the liquid treatment system in 1) in a recirculating arrangement where the liquid to be treated is continually passed through the liquid treatment system, comprising:

29) The liquid treatment system of 1) installed in-line or at the end of the said liquid flow path.

30) A system/method according to 1) that can control the concentrations of useful substance(s), producible by the system, in the liquid stream leaving the liquid treatment system at optimal levels for treatment purposes, in a one-pass arrangement, comprising: The electronic control system determining the flow rate of fluid passing through the system; The electronic control system having in storage information about the performance and output of the electrolytic treatment system; The electronic control system having in storage information about the desired concentrations of useful substance(s) for treatment purposes; The electronic control system determining the concentrations of useful substance(s) entering the system in the inlet stream, by: Receiving inlet concentrations data from one or more sensors within the liquid treatment system; or Receiving inlet concentrations data from the user through the user input or communications system; or Assuming a default inlet concentration value stored in the electronic storage medium.

31) The electronic control system determining the additional mass of useful substance(s) required to be produced by the electrolytic treatment system in order to bring the concentrations of useful substance(s) in the liquid stream leaving the liquid treatment system at optimal levels for treatment purposes, based on at least: The flow rate of fluid; Inlet concentrations of useful substance(s); and Desired outlet concentrations of useful substance(s).

32) The electronic control system determining the mode of operation and total electrical charge to be supplied to the electrolytic treatment system per unit of time, based on at least: Additional mass of useful substance(s) required to be produced by the electrolytic treatment system; and Performance of the electrolytic treatment system.

33) The electronic control system adjusting the mode of operation of the electrolytic treatment system.

34) The electronic control system supplying the electrolytic treatment system with the determined total electrical charge per unit of time.

35) A liquid treatment system comprising: A housing to be mounted in-line or at the end of a liquid flow path; An ozone treatment system disposed within the housing;

36) A hydro generation system disposed within the housing with a rotatable member designed to be rotated by the flow of liquid and produce enough electrical power to operate the liquid treatment system; An electronic control system disposed within a sealed waterproof enclosure in the housing designed to at least: Receive and manage the electrical power produced by the hydro generation system; and Control the output of the ozone treatment system by controlling the electrical power transferred to the ozone treatment system.

37) A water treatment unit comprising: a plurality of modular components physically connected by a housing; the housing comprising a tube that defines a water flow path; the plurality of components comprising: a hydro generation component disposed at an outlet portion of the housing, the hydro generation component comprising a generating component located substantially within the housing and a fixed exit portion disposed in an outlet end cap disposed at the outlet portion of the housing; an electrolytic treatment component disposed within the housing between the outlet portion and an inlet portion of the housing; an electronic control system comprising an inlet end cap; wherein the water treatment unit may be assembled by inserting the generating component and the electrolytic treatment component into the housing and affixing the outlet end cap to the outlet portion of the housing and the inlet end cap to the inlet portion of the housing.

38) The water treatment unit of 37), wherein each of the plurality of modular components comprise an electrical connection, and wherein assembly of the water treatment system comprises completing an electrical pathway between at least the generating component, the electronic control system, and the electrolytic treatment component.

Throughout the specification, terms such as "may" and "can" are used interchangeably and use of any particular term should not be construed as limiting the scope or requiring experimentation to implement the claimed subject matter or embodiments described herein. Further, the various features and adaptations described in respect of one example or embodiment in this disclosure can be used with other examples or embodiments described herein, as would be understood by the person skilled in the art.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

What is claimed is:

1. A hydro generation system comprising:
   a housing defining a liquid flow path, and adapted to receive an inlet flow of liquid and to deliver an exit flow of liquid;
   an electrical generator centrally located within the liquid flow path, and positioned such that the liquid flows around the electrical generator and within the housing parallel to the inlet flow;
   a rotatable member including a plurality of blades, the rotatable member connected to the electrical generator to transfer mechanical rotational energy to the electrical generator to generate electrical power, a rotational axis of the rotatable member parallel to the inlet flow and centrally located within the liquid flow path; and,
   a plurality of mechanical guide features surrounding the circumference and extending at least partially alongside the blades of the rotatable member, to receive the liquid flowing around the electrical generator, and to direct and accelerate the received fluid inward toward the blades of the rotatable member and at advantageous angles to assist in rotating the rotatable member.

2. The hydro generation system of claim 1 further comprising:
   an electrolytic treatment system situated within the liquid flow path in advance of the electrical generator and adapted to receive a portion of the electrical power produced by the hydro generation system to produce and release one or more product substances into the liquid flow path.

3. The hydro generation system of claim 2 further comprising:
   an electronic control system for receiving and using a remainder of the electrical power produced by the hydro generation system to power the electronic control system, the electronic control system operative to control the production and release of the one or more product substances by the electrolytic treatment system.

4. The hydro generation system of claim 3, wherein the hydro generation system is further operative to provide a measurement of the flow of water to the electronic control system, and wherein the measurement comprises at least one of a voltage or a current generated by the hydro generation system.

5. The hydro generation system of claim 3, further comprising:
an inlet end cap containing the electronic control system and defining a fluid inlet for the housing; and,
an outlet end cap defining a fluid outlet for the housing and including the one or more mechanical guide features.

6. The hydro generation system of claim 4, wherein the electronic control system further comprises a pre-determined mapping that correlates the measurement provided by the hydro generation system to a product substance production rate corresponding to the water flow rate through the housing.

7. The hydro generation system of claim 2, wherein the electrolytic treatment system comprises at least one of:
a salt chlorination electrolytic cell and the one of the one or more product substances comprises chlorine; and,
a metal ionization cell and at least one of the one or more product substances are selected from the group consisting of copper ions and silver ions.

8. The hydro generation system of claim 2, wherein the electrolytic treatment system comprises two separate electrolytic cells, wherein
a) a first electrolytic cell comprises a salt chlorination electrolytic cell for producing chlorine; and,
b) a second electrolytic cell comprises a metal ionization electrolytic cell for producing metallic ions useful for water treatment.

9. The hydro generation system of claim 1, wherein the one or more mechanical guide features comprise a plurality of guide vanes.

10. The hydro generation system of claim 1, wherein only a fraction of the available energy is extracted from the inlet flow of liquid.

11. A method of treating water comprising:
receiving water flowing through a flow path;
diverting the flow path around an electrical generator, the electrical generator connected to a rotatable member that includes a plurality of blades;
at least partially alongside the blades of the rotatable member, directing and accelerating the circumference of diverted water inward towards the blades of the rotatable member and at advantageous angles to assist in rotating the rotatable member;
rotating the rotatable member using the directed and accelerated water to generate power from the flowing water and,
directing a portion of the generated power to an electrolytic cell to produce one or more product substances for treating the water.

12. The method of claim 11, further comprising:
measuring a flow rate of the liquid flow from the generated power; and,
controlling the portion of the generated power directed to the electrolytic cell proportional to the measured flow rate.

13. The method of claim 11, wherein at least one of the one or more product substances are selected from the group consisting of chlorine, copper ions, and silver ions.

14. The method of claim 11, wherein only a fraction of the available energy is extracted from the received water flow.

15. A modular water treatment system comprising:
a plurality of modular components physically connected by a housing, the housing comprising a tube that defines a liquid flow path, and is adapted to receive an inlet flow of liquid and to deliver an exit flow of liquid;
the plurality of components comprising:
a hydro generation component located within the housing and situated to extract a portion of the energy of the received flow of liquid;
an electrolytic treatment component located within the housing in advance of the hydro generation component and comprising at least two electrodes extending parallel to the water flow path,
an electronic control component powered by the electrical generator and operative to control activation of the electrolytic treatment system by selectively directing power from the electrical generator to the at least two electrodes,
an inlet end cap for sealing the modular components at an inlet end of the housing and receiving the inlet flow, and
an outlet end cap for sealing the modular components at an outlet end of the housing and defining an outlet for the exit flow;
wherein each of the plurality of modular components comprise an electrical connection, and wherein assembly of the water treatment system comprises completing an electrical pathway between at least the generating component, the electronic control system, and the electrolytic treatment component by inserting the hydro generation component and the electrolytic treatment component into the housing and securing the inlet end cap and the outlet end cap on opposed ends of the housing to secure the plurality of modular components in physical contact with one another to complete the electrical pathway.

16. The modular water treatment unit of claim 15, wherein the inlet end cap comprises the electronic control component.

17. The water treatment unit of claim 15, wherein the outlet end cap further comprises the one or more mechanical guide features.

18. The water treatment unit of claim 15, wherein the hydrogenation component comprises:
an electrical generator centrally located within the liquid flow path, and positioned such that the liquid flows around the electrical generator and within the housing parallel to the inlet flow;
a rotatable member including a plurality of blades, the rotatable member connected to the electrical generator to transfer mechanical rotational energy to the electrical generator to generate electrical power, a rotational axis of the rotatable member parallel to the inlet flow and centrally located within the liquid flow path; and,
a plurality of mechanical guide features surrounding the circumference and extending at least partially alongside the blades of the rotatable member, to receive the liquid flowing around the electrical generator, and to direct and accelerate the received fluid inward toward the blades of the rotatable member and at advantageous angles to assist in rotating the rotatable member.

* * * * *